May 31, 1966  A. SABATINO ETAL  3,253,306
MACHINE FOR MAKING STORAGE BATTERY ELEMENTS
Filed Dec. 30, 1960  40 Sheets-Sheet 1
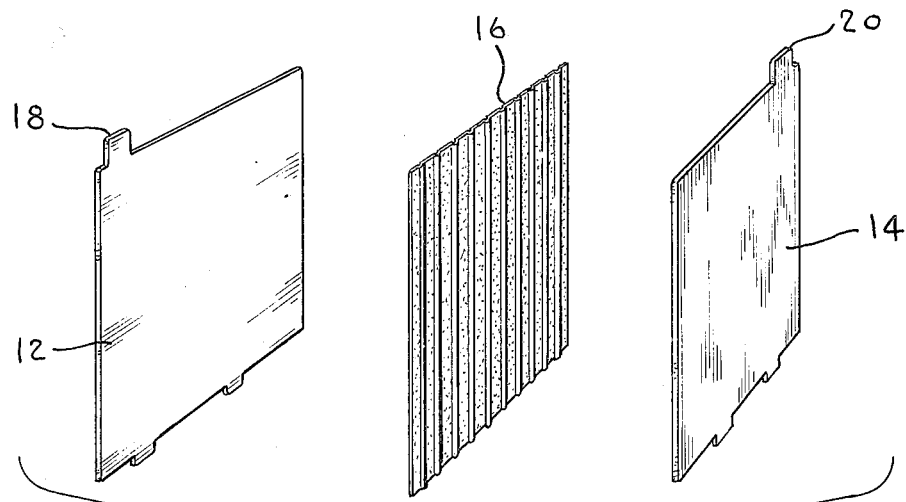
FIG. 1
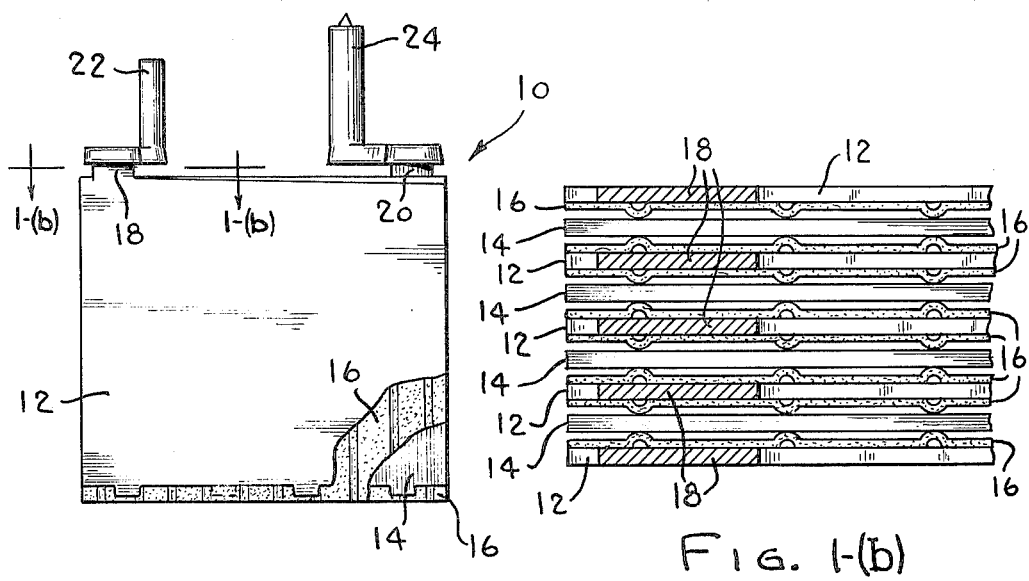
FIG. 1-(a)  FIG. 1-(b)
INVENTORS
ANTHONY SABATINO
RICHARD A. BUTTKE
PAUL V. LOWE
BY John W. Michael
ATTORNEY

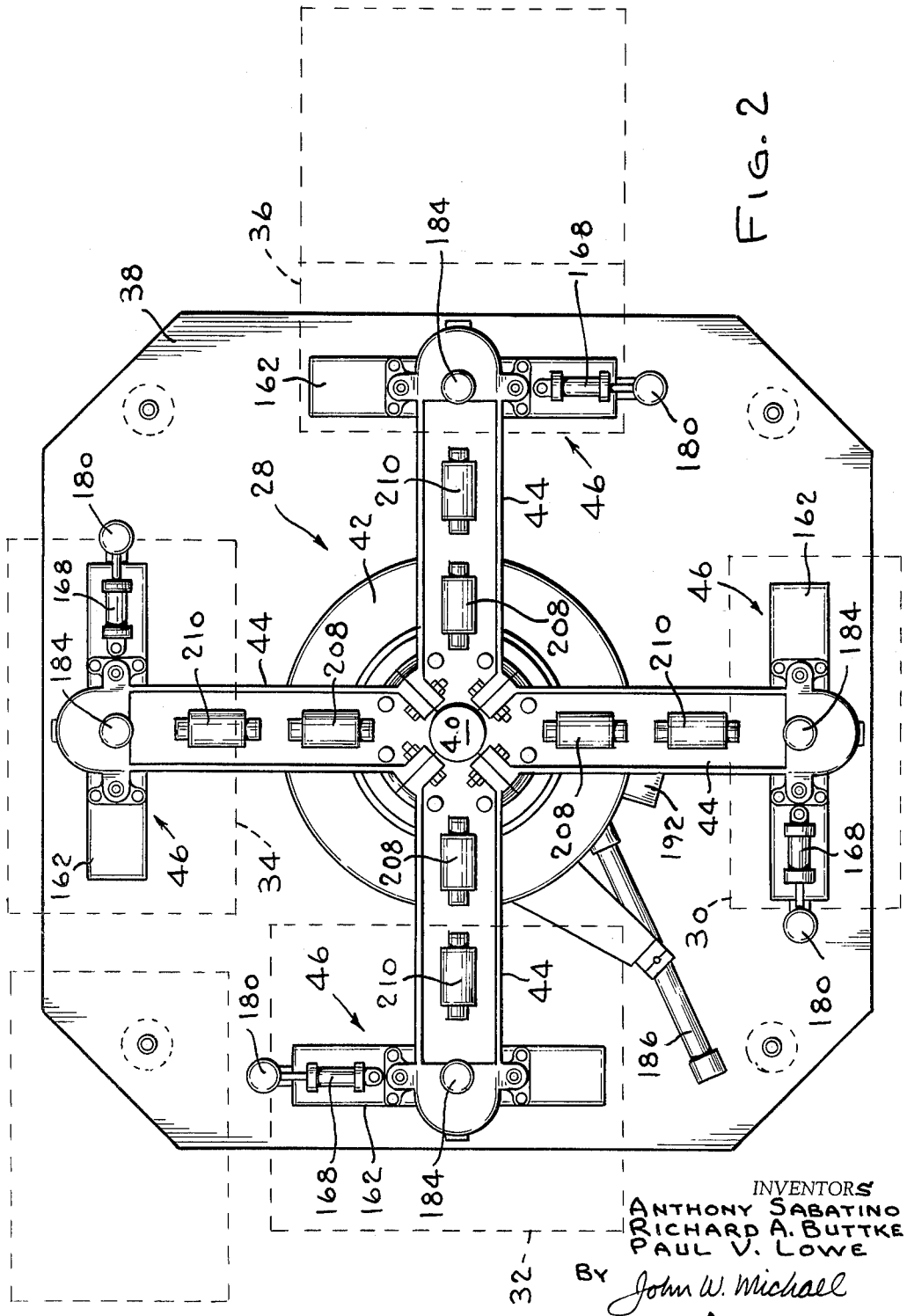

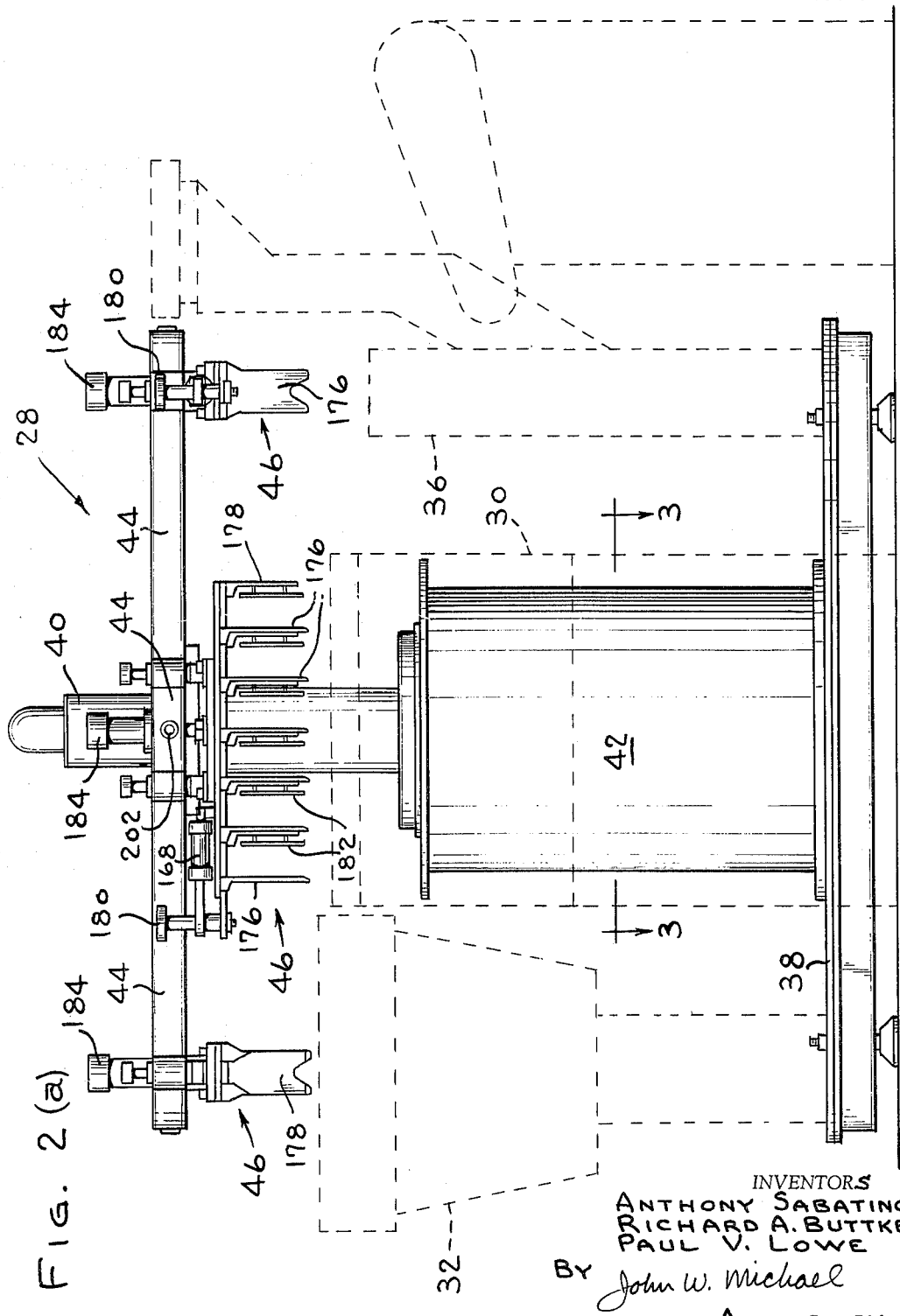

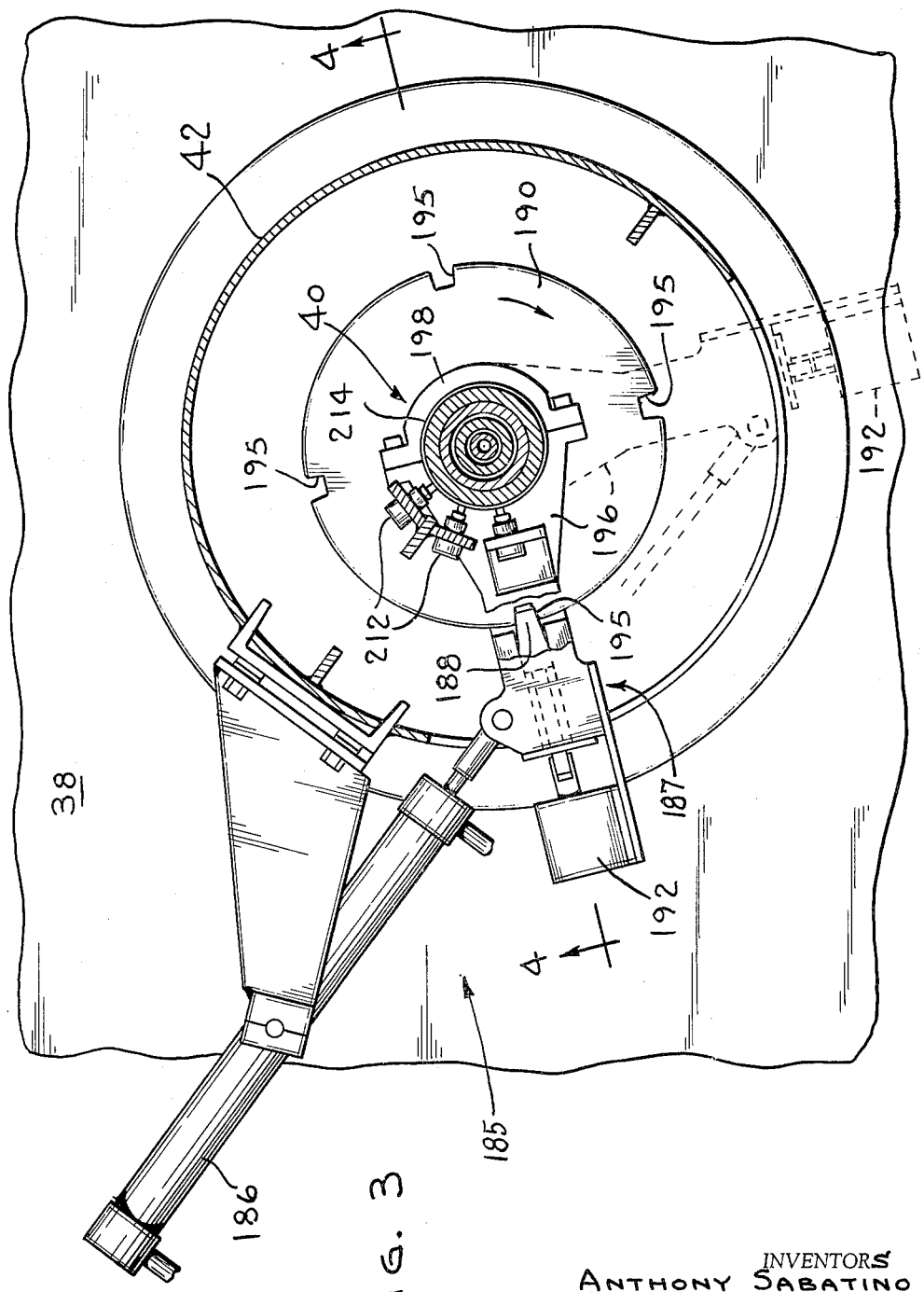

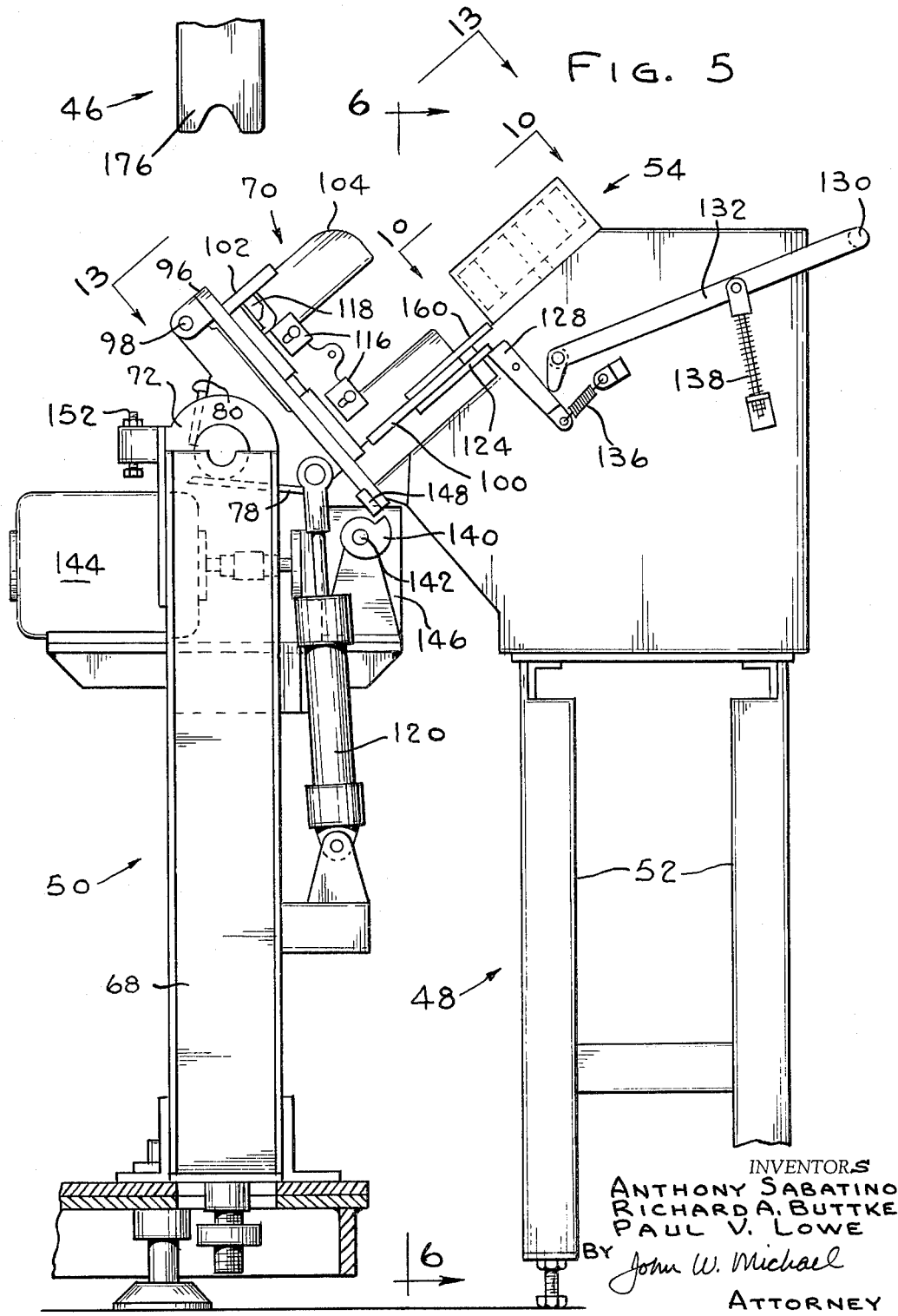

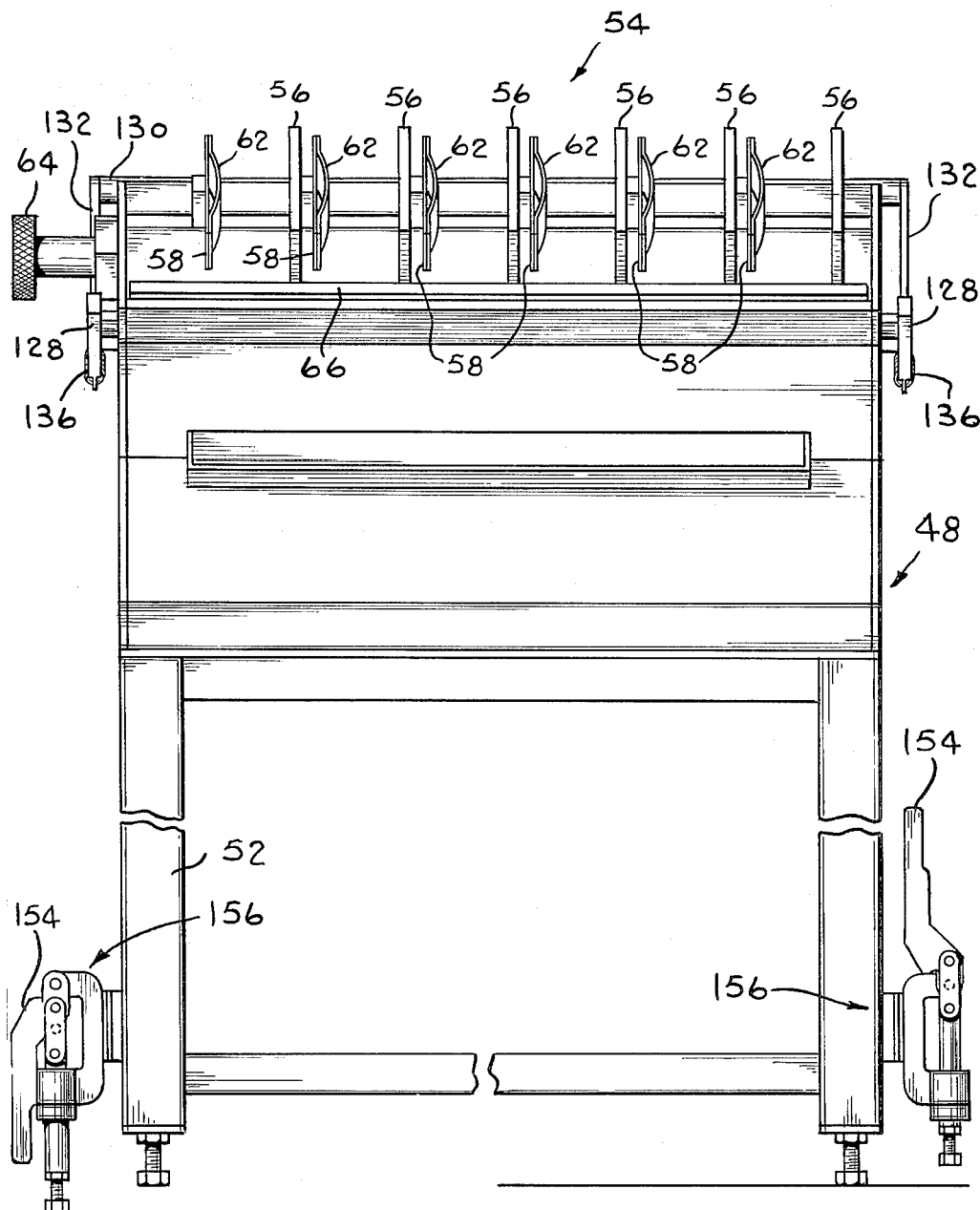

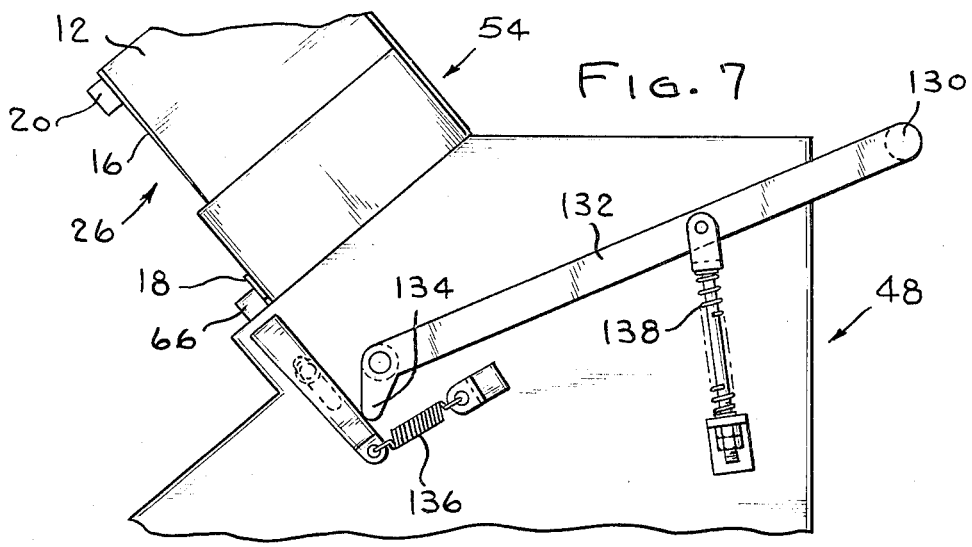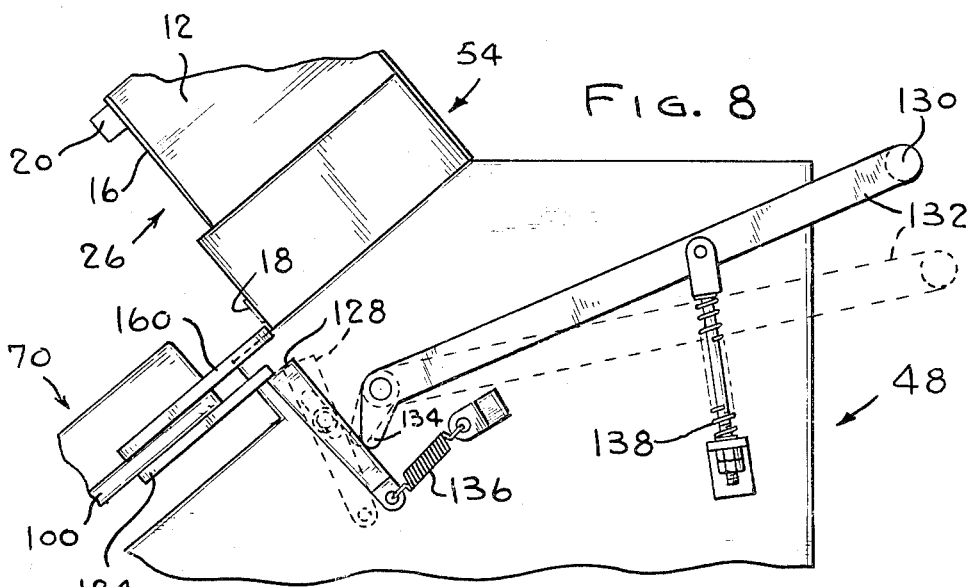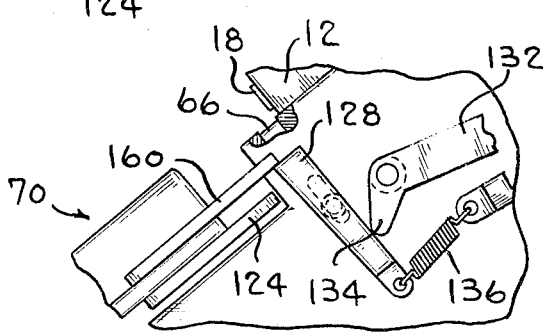

May 31, 1966 A. SABATINO ETAL 3,253,306
MACHINE FOR MAKING STORAGE BATTERY ELEMENTS
Filed Dec. 30, 1960 40 Sheets-Sheet 9
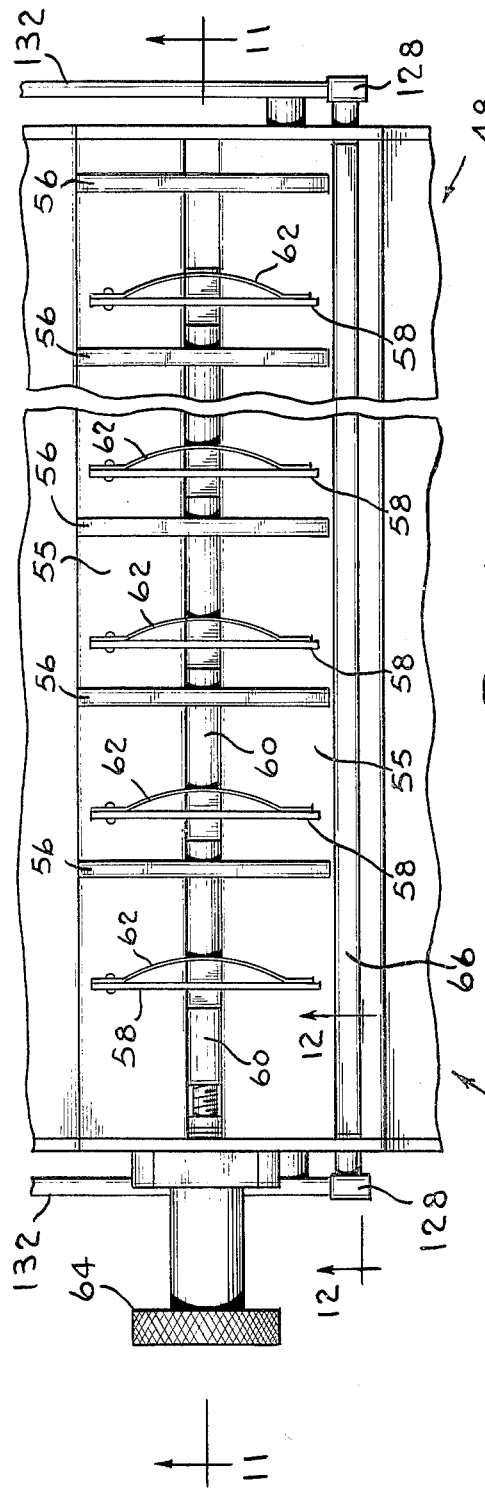
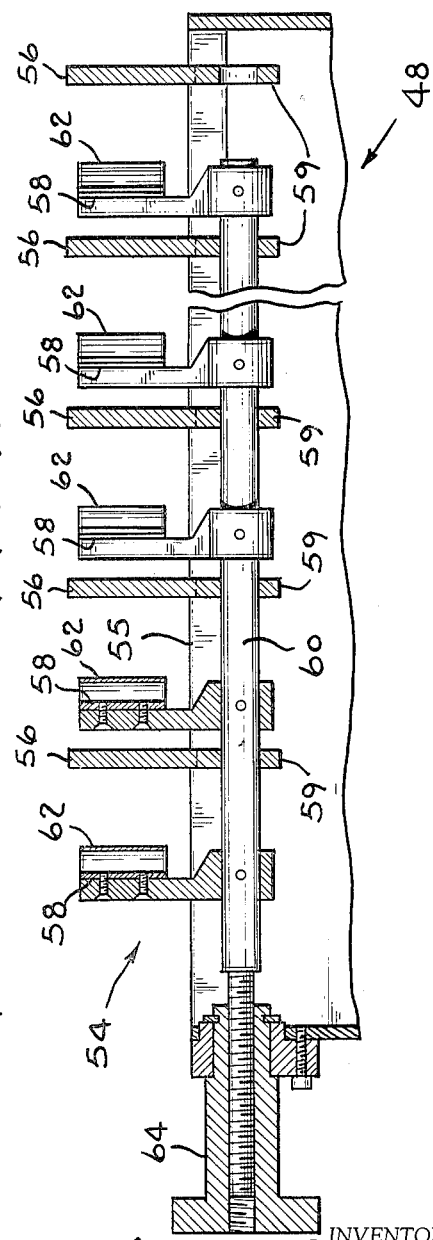
INVENTORS
ANTHONY SABATINO
RICHARD A. BUTTKE
PAUL V. LOWE
BY John W. Michael
ATTORNEY May 31, 1966  A. SABATINO ETAL  3,253,306
MACHINE FOR MAKING STORAGE BATTERY ELEMENTS
Filed Dec. 30, 1960  40 Sheets-Sheet 10
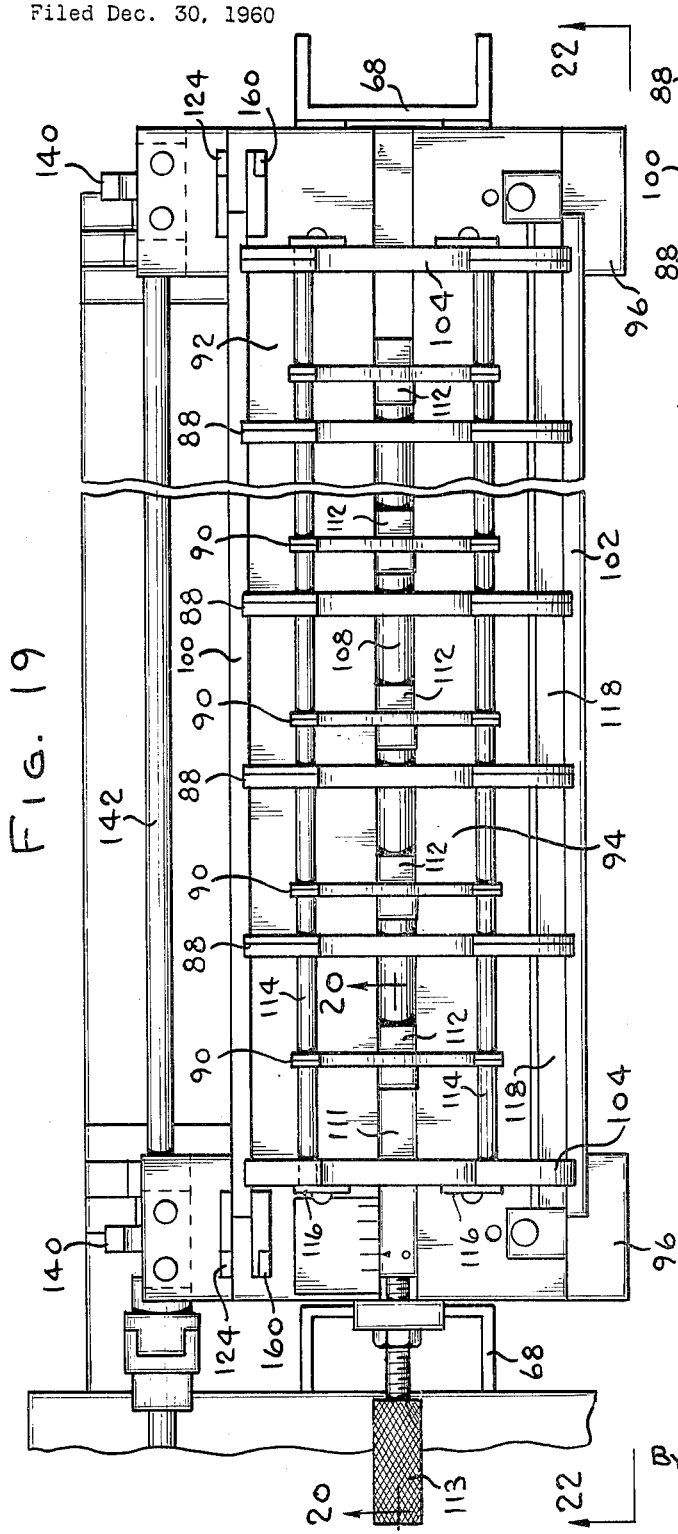
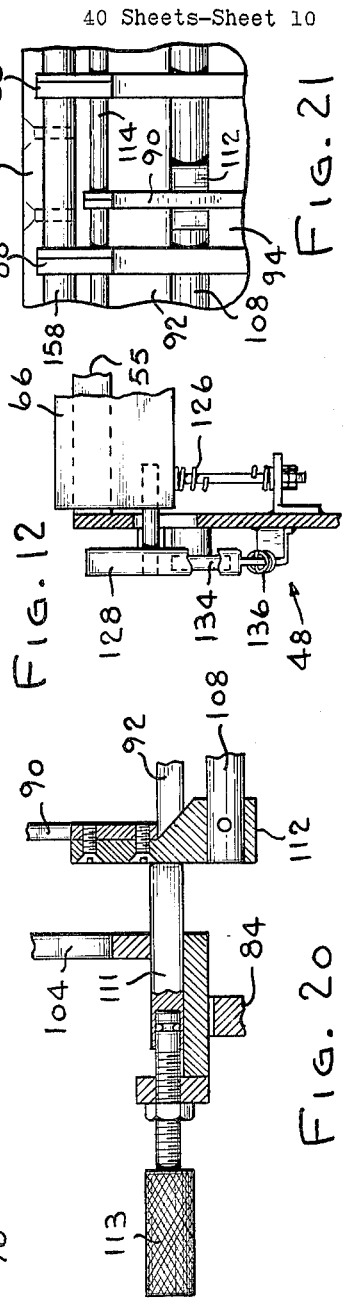
INVENTORS
ANTHONY SABATINO
RICHARD A. BUTTKE
PAUL V. LOWE
BY John W. Michael
ATTORNEY

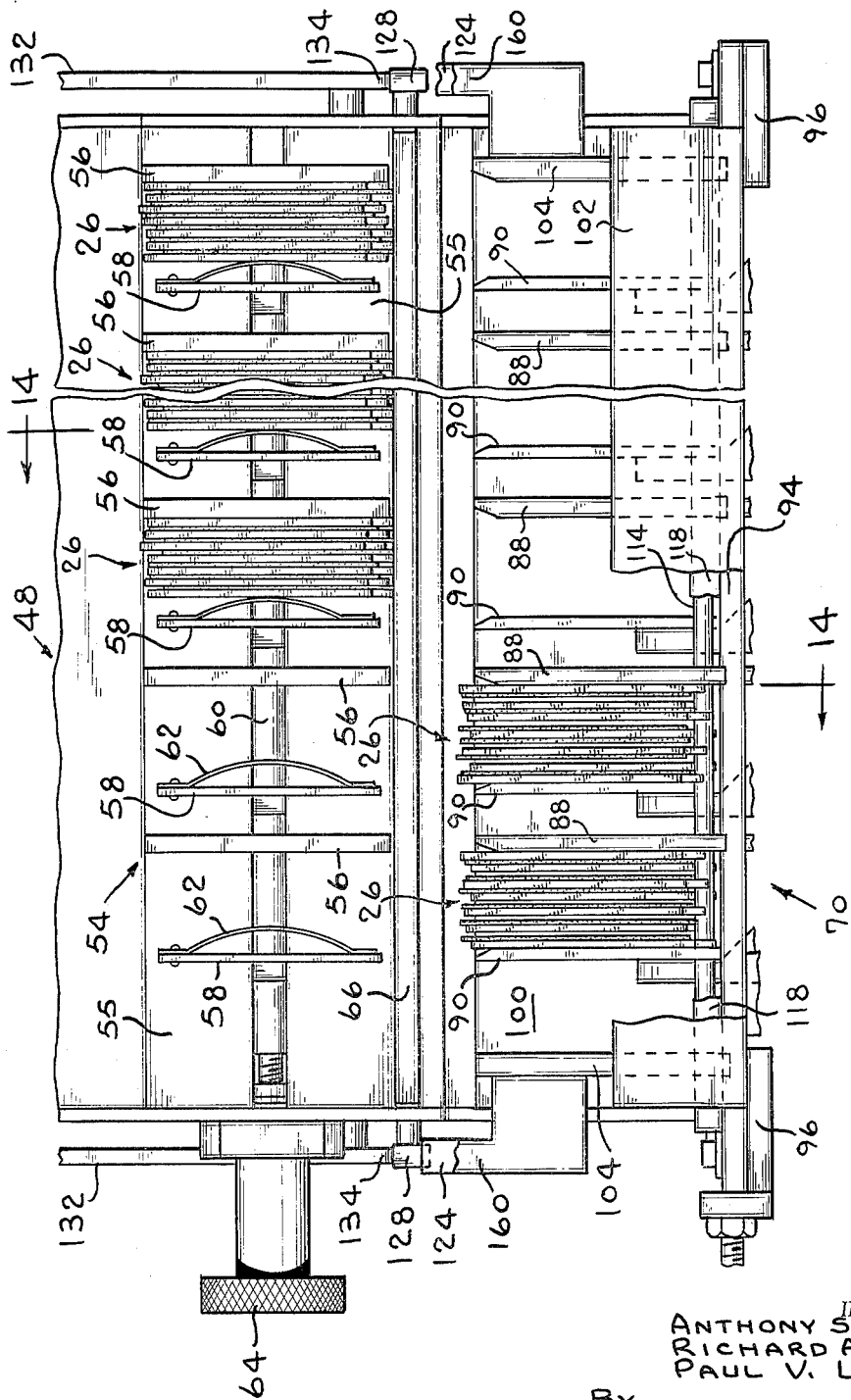

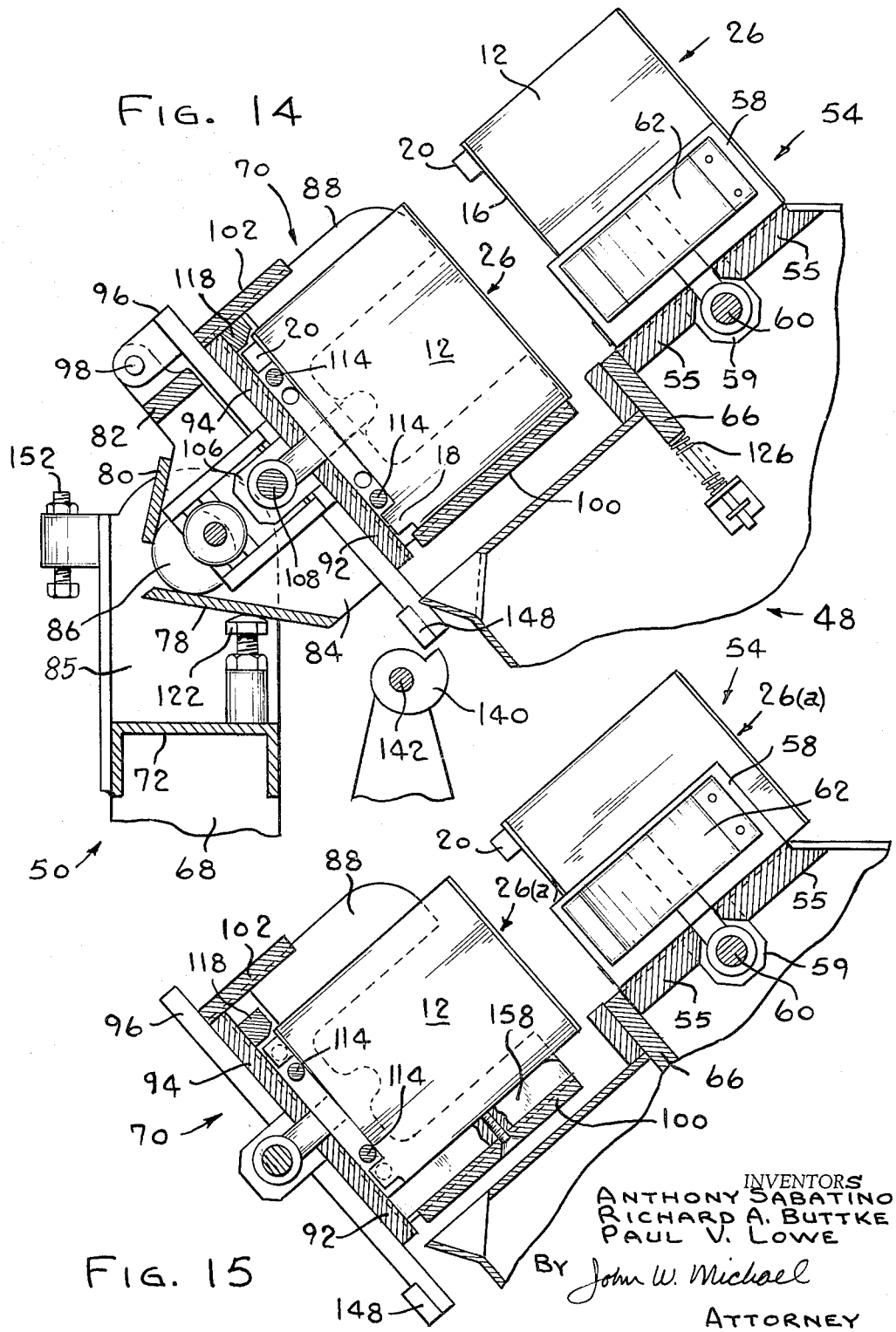

INVENTORS
ANTHONY SABATINO
RICHARD A. BUTTKE
PAUL V. LOWE
BY John W. Michael
ATTORNEY

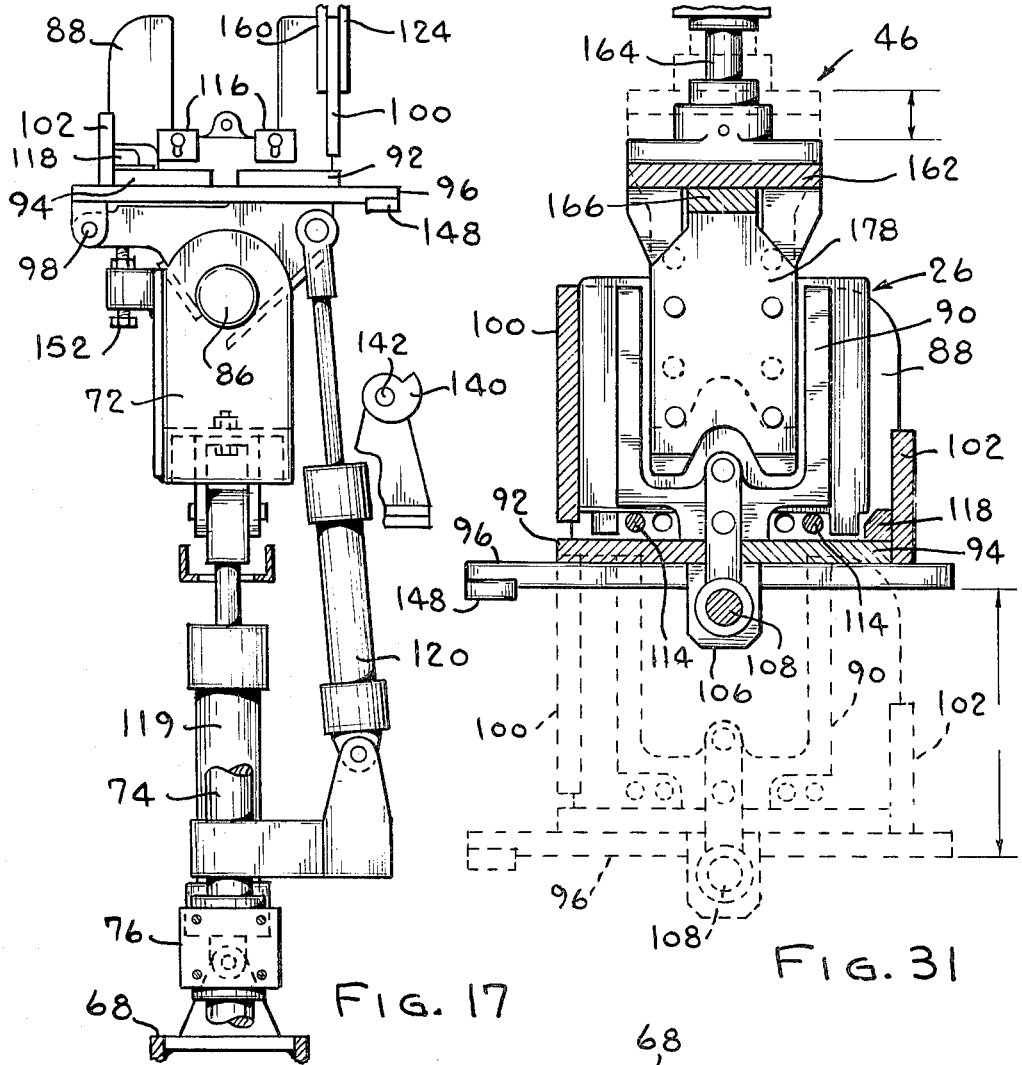
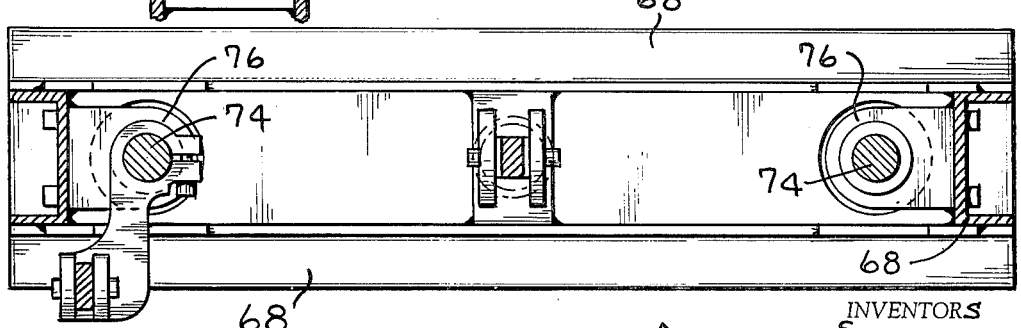

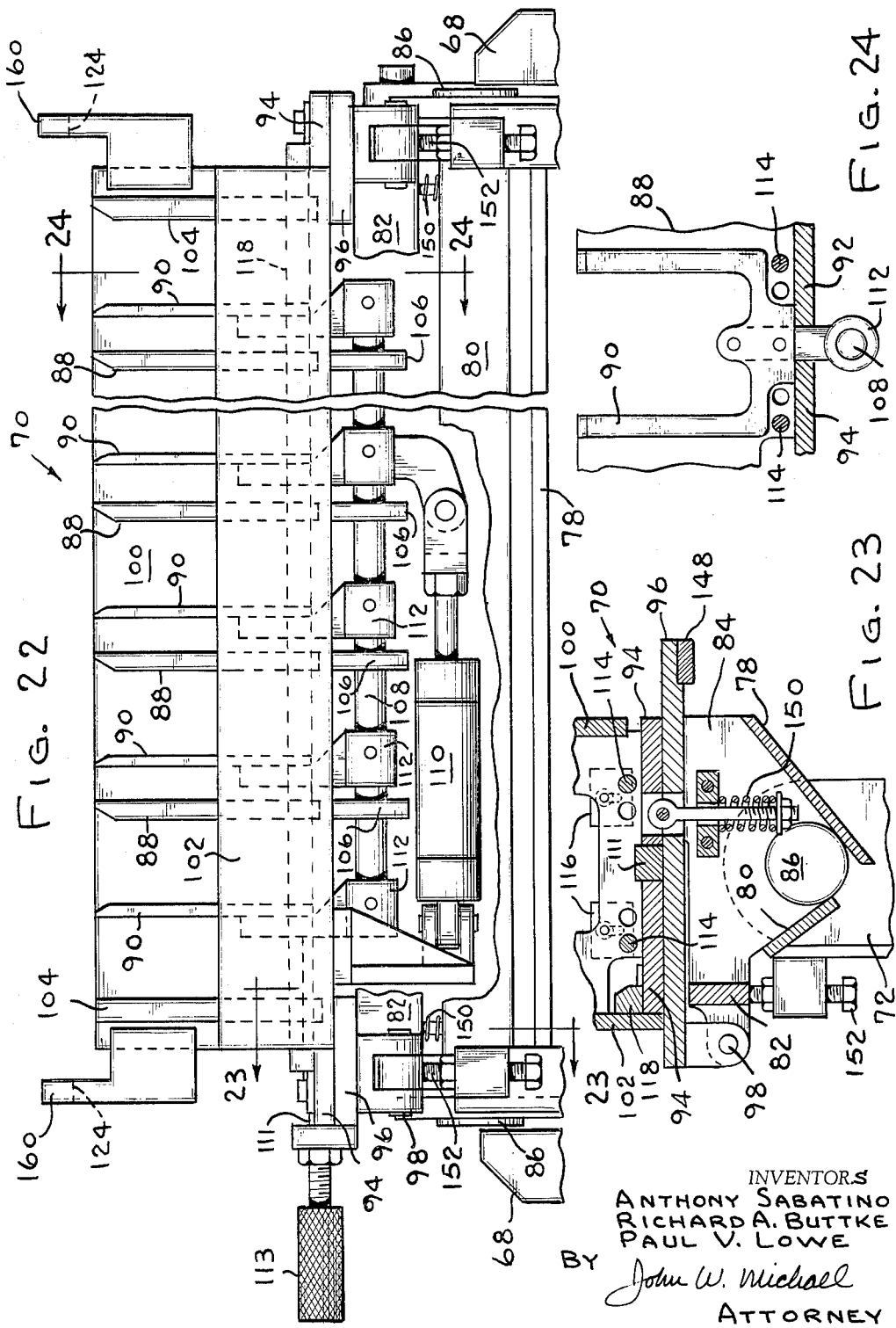

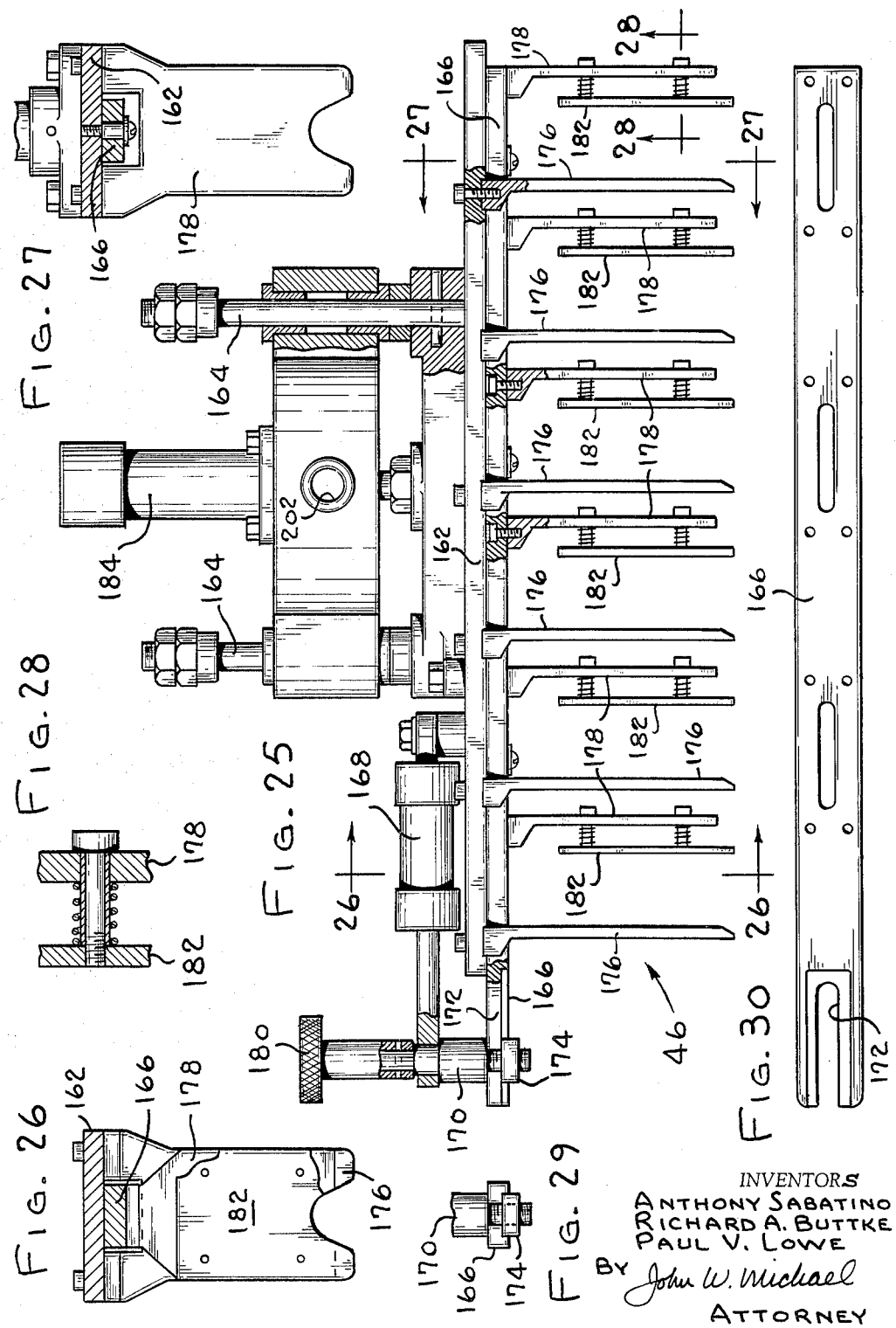

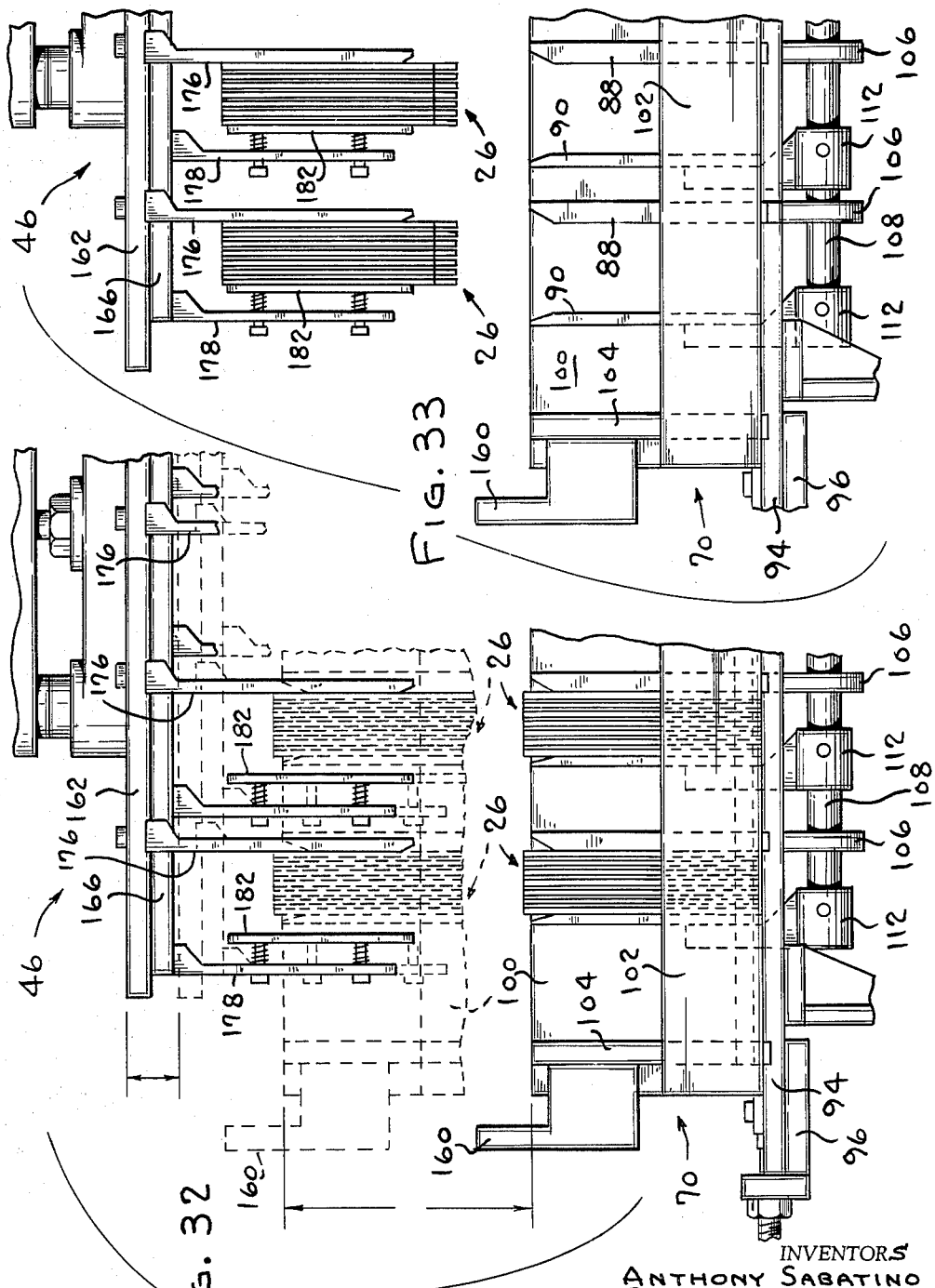

May 31, 1966 A. SABATINO ETAL 3,253,306
MACHINE FOR MAKING STORAGE BATTERY ELEMENTS
Filed Dec. 30, 1960 40 Sheets-Sheet 18

INVENTORS
ANTHONY SABATINO
RICHARD A. BUTTKE
PAUL V. LOWE
BY John W. Michael
ATTORNEY INVENTORS
ANTHONY SABATINO
RICHARD A. BUTTKE
PAUL V. LOWE
BY John W. Michael
ATTORNEY

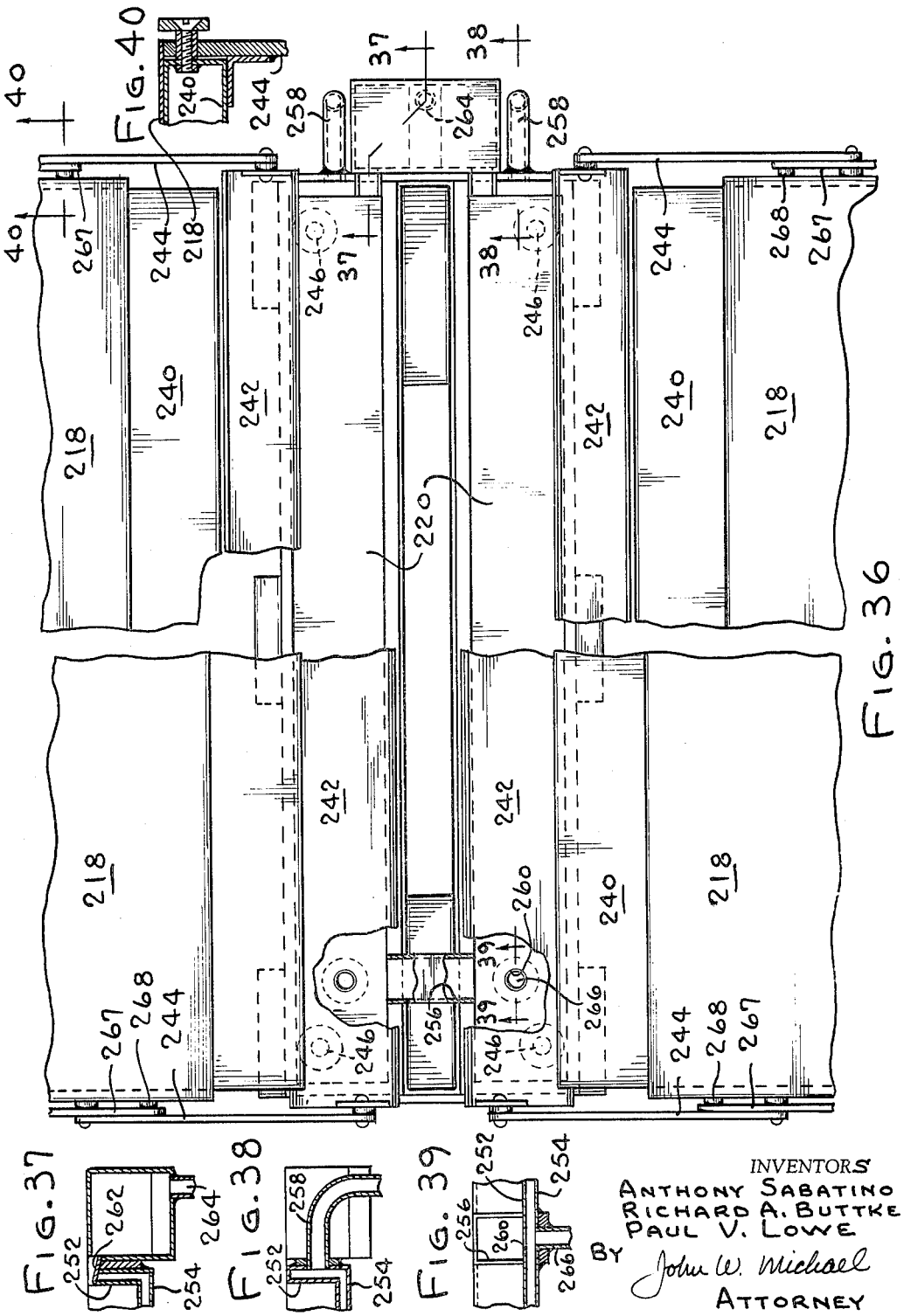

May 31, 1966 A. SABATINO ETAL 3,253,306
MACHINE FOR MAKING STORAGE BATTERY ELEMENTS
Filed Dec. 30, 1960 40 Sheets-Sheet 22

INVENTORS
ANTHONY SABATINO
RICHARD A. BUTTKE
PAUL V. LOWE
BY John W. Michael
ATTORNEY

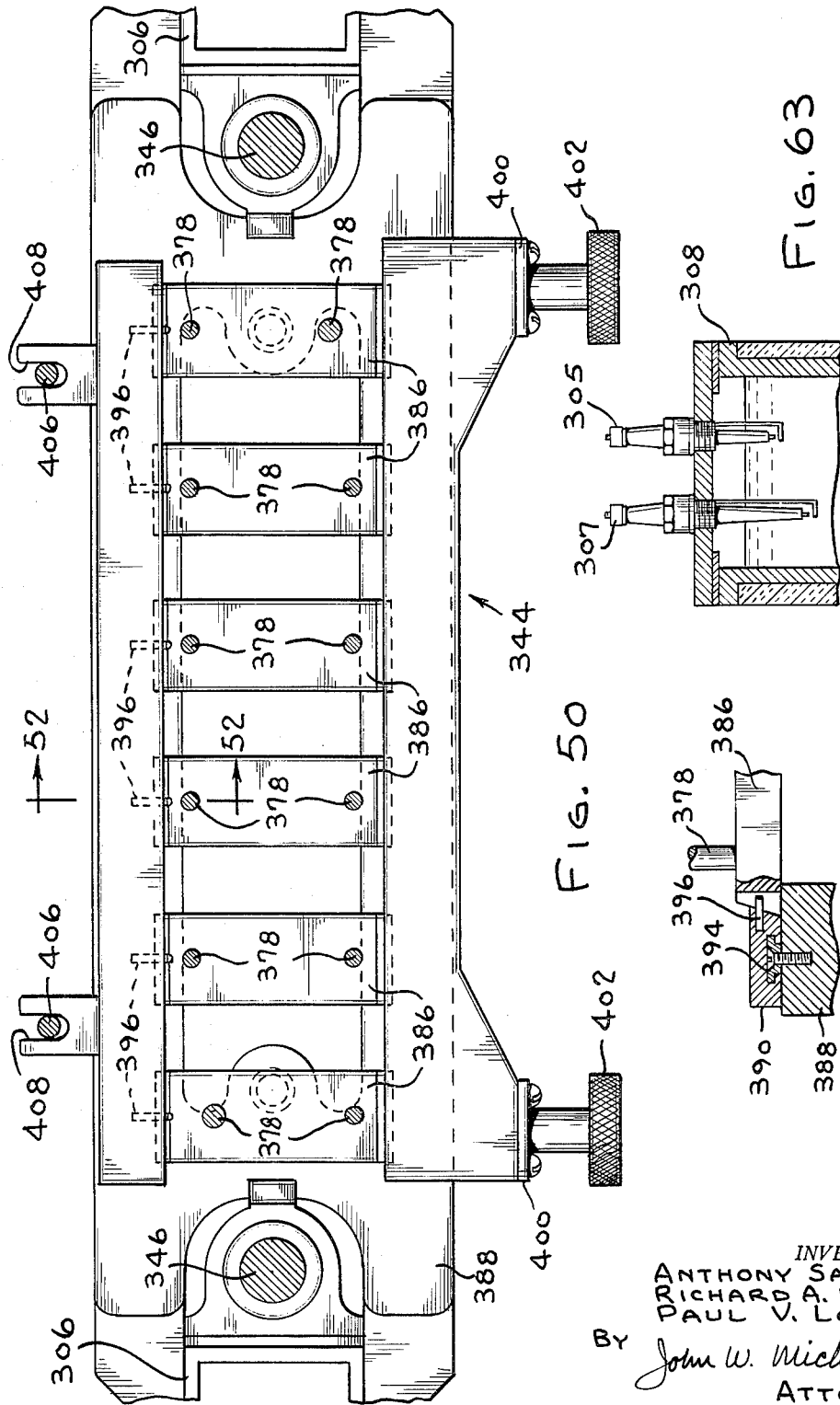

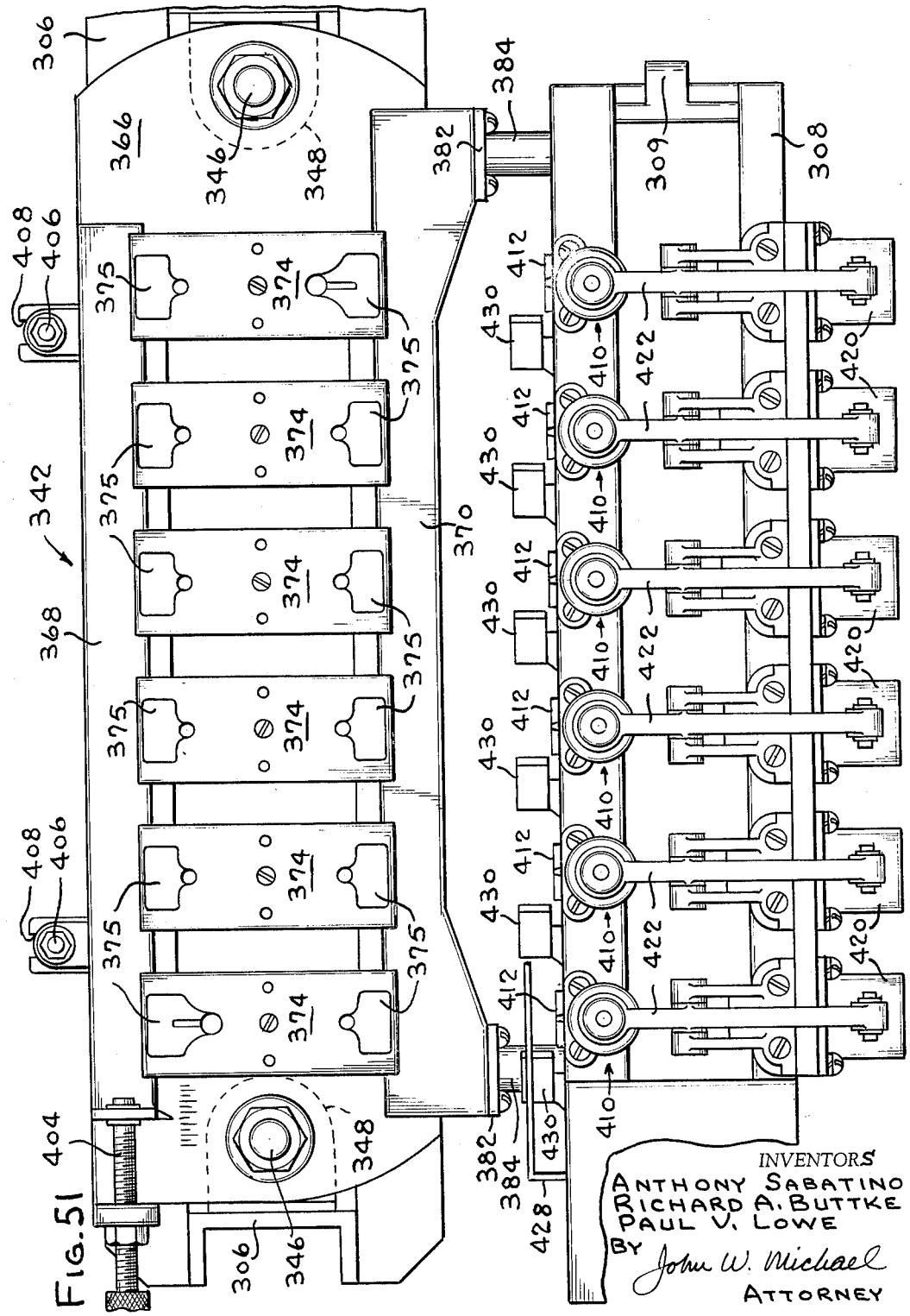

INVENTORS
ANTHONY SABATINO
RICHARD A. BUTTKE
PAUL V. LOWE
BY John W. Michael
ATTORNEY May 31, 1966   A. SABATINO ETAL   3,253,306
MACHINE FOR MAKING STORAGE BATTERY ELEMENTS
Filed Dec. 30, 1960   40 Sheets-Sheet 33
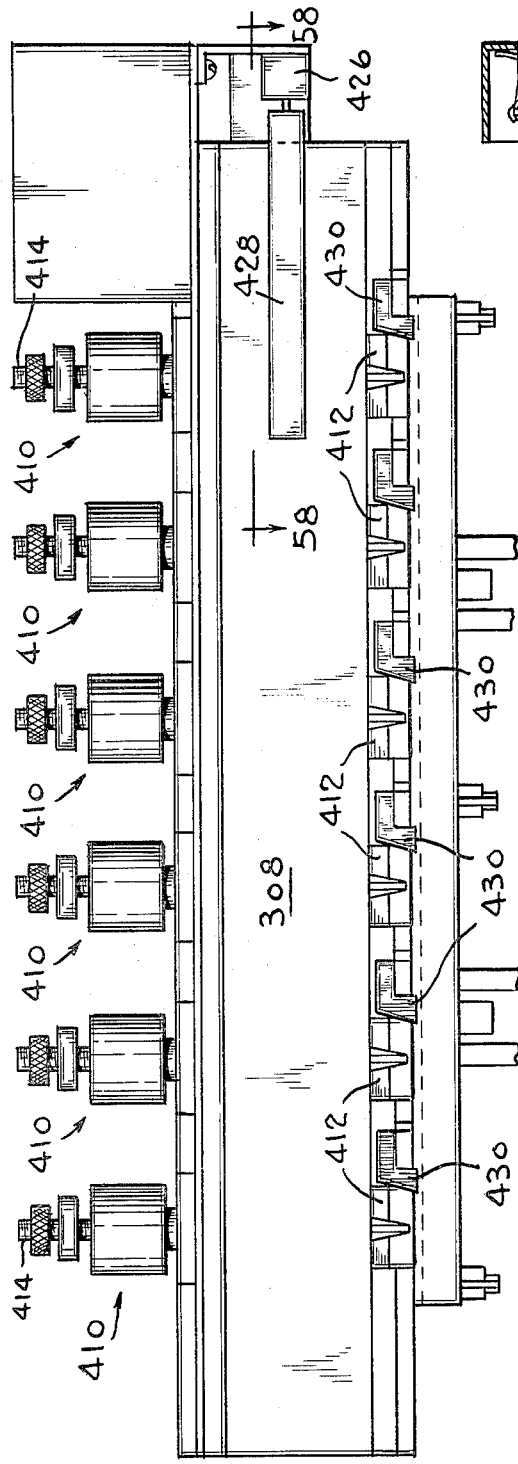
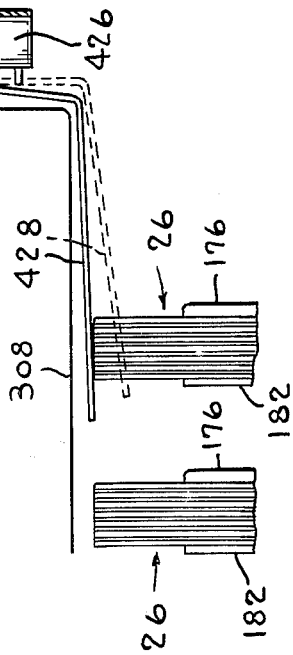
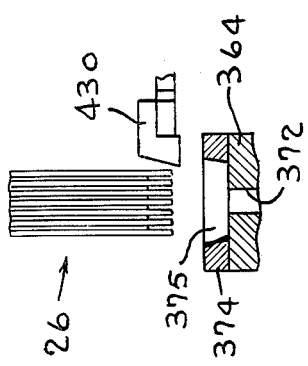
INVENTORS
ANTHONY SABATINO
RICHARD A. BUTTKE
PAUL V. LOWE
BY John W. Michael
ATTORNEY

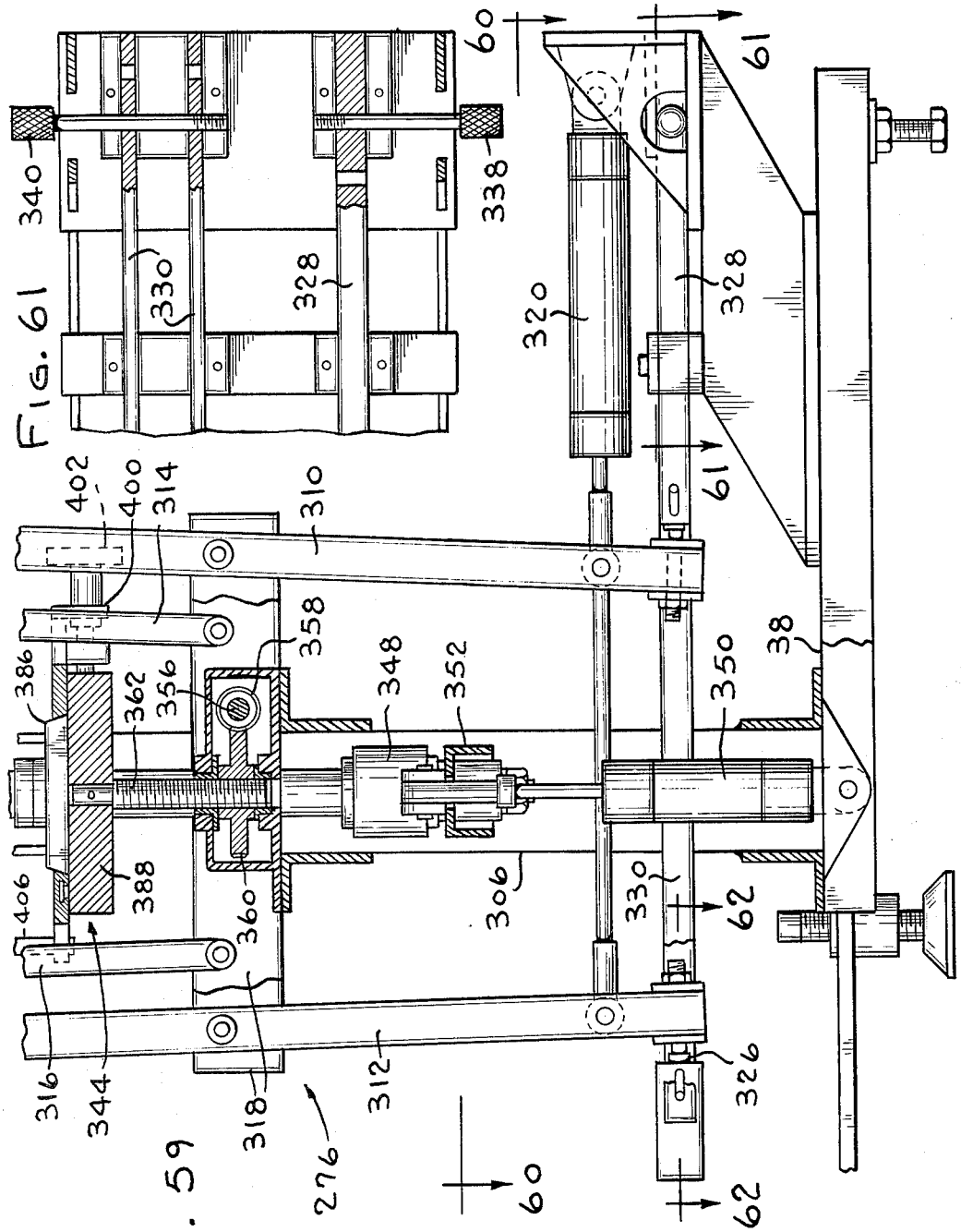

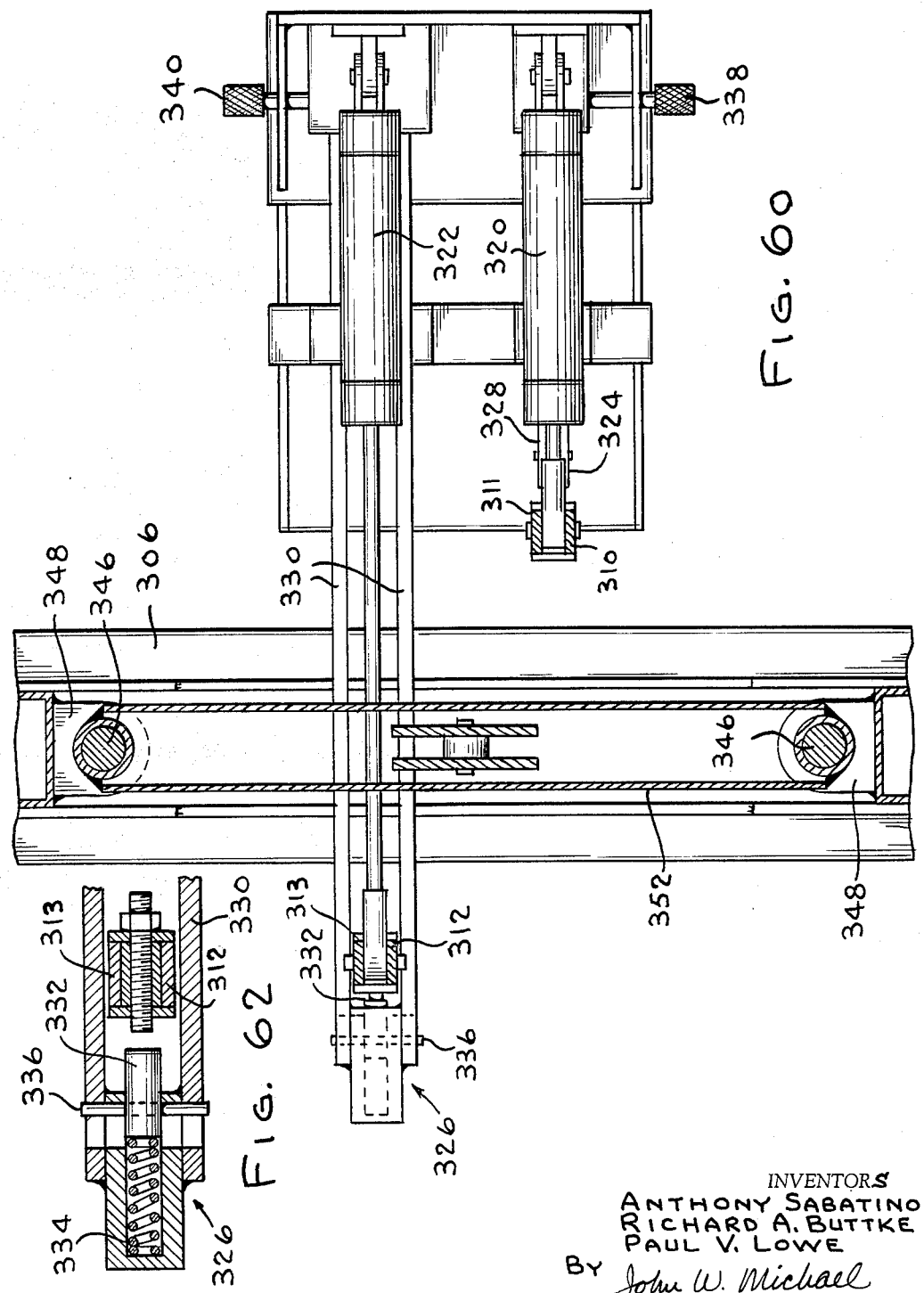

May 31, 1966 A. SABATINO ETAL 3,253,306
MACHINE FOR MAKING STORAGE BATTERY ELEMENTS
Filed Dec. 30, 1960 40 Sheets-Sheet 37
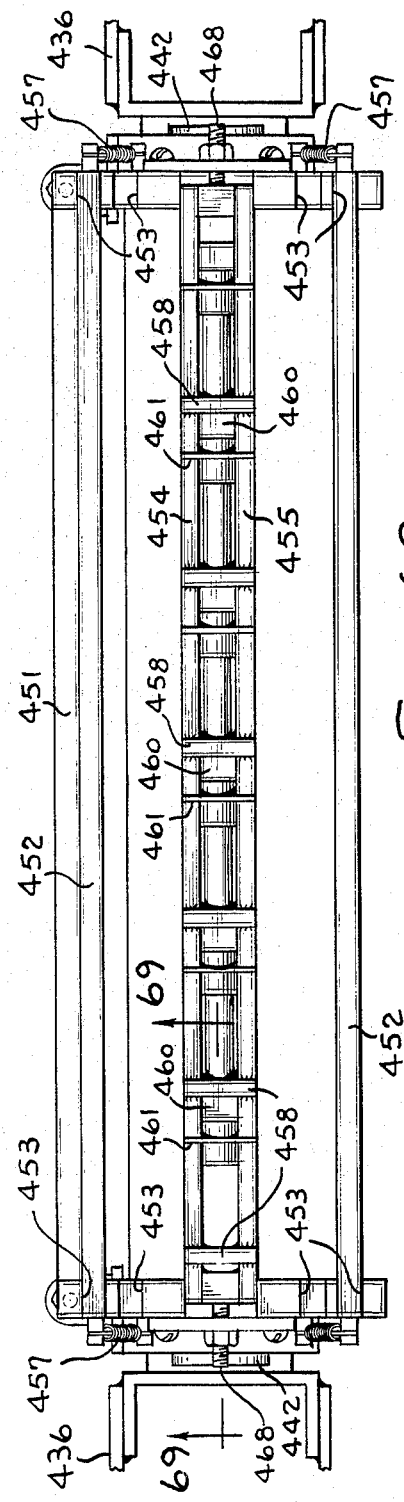
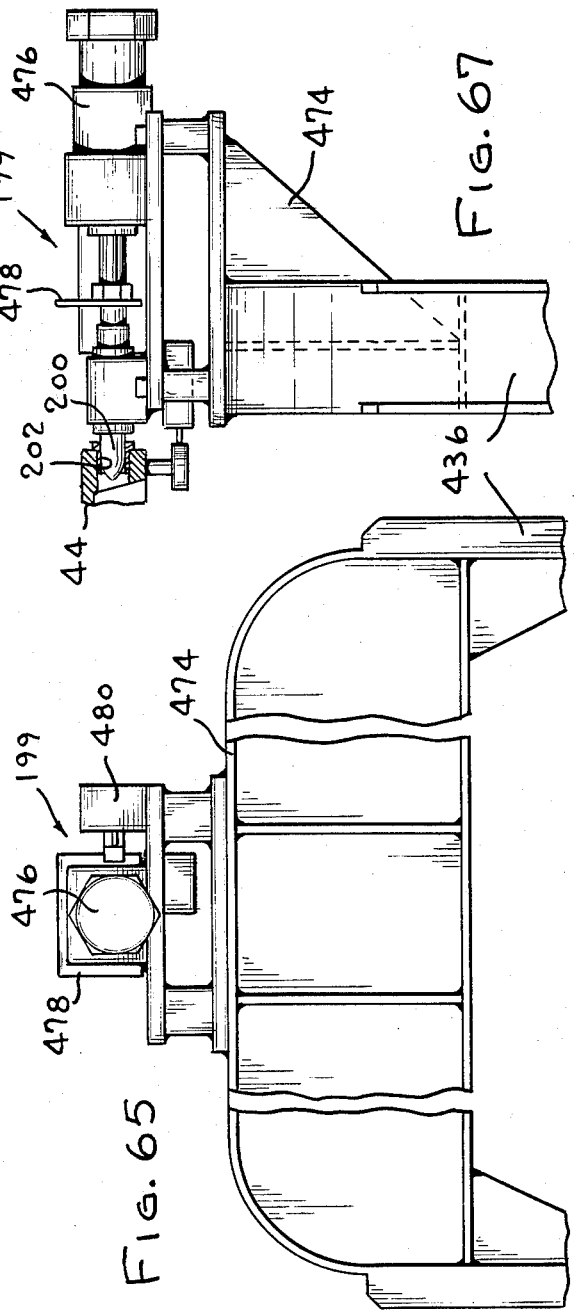
INVENTORS
ANTHONY SABATINO
RICHARD A. BUTTKE
PAUL V. LOWE
BY John W. Michael
ATTORNEY

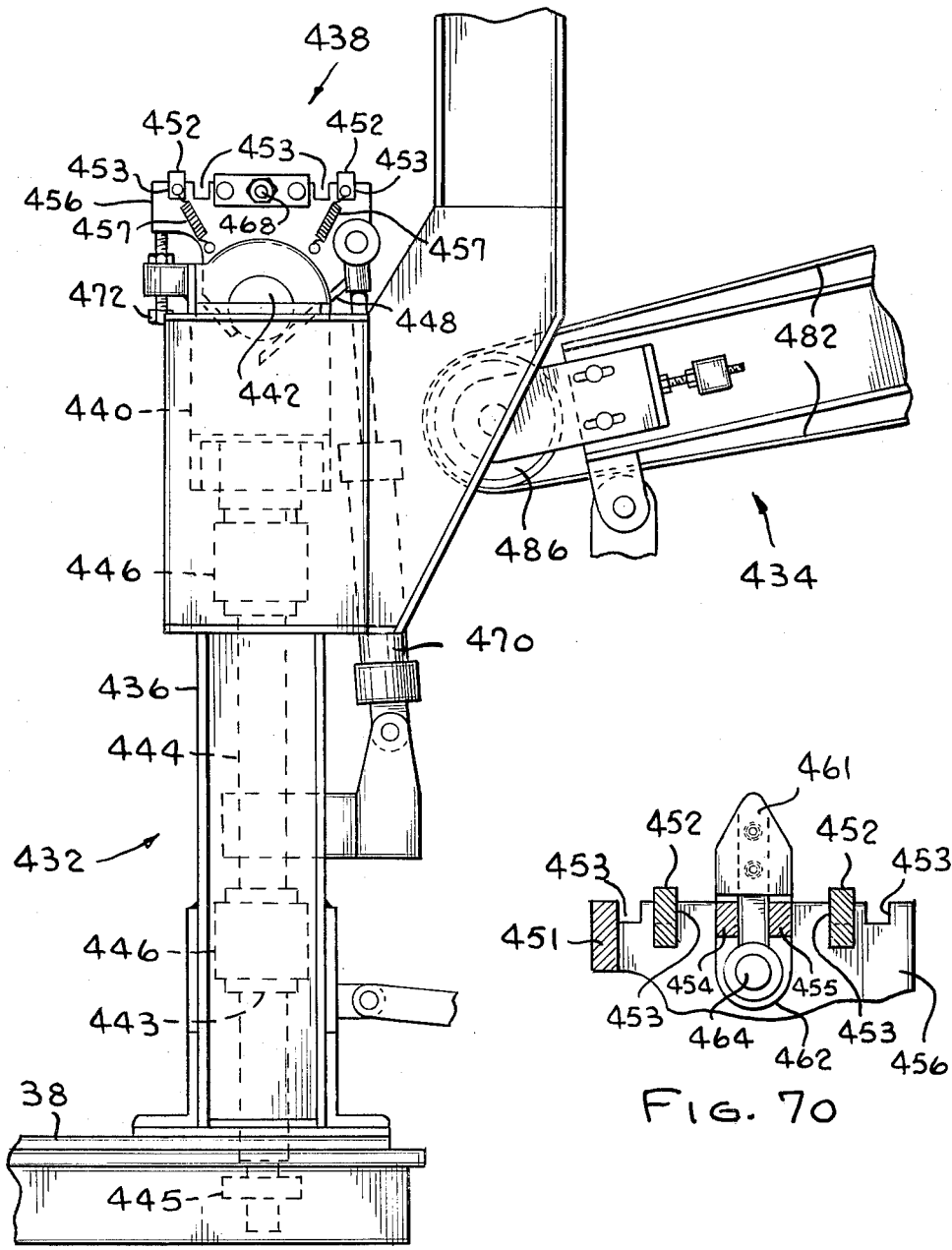

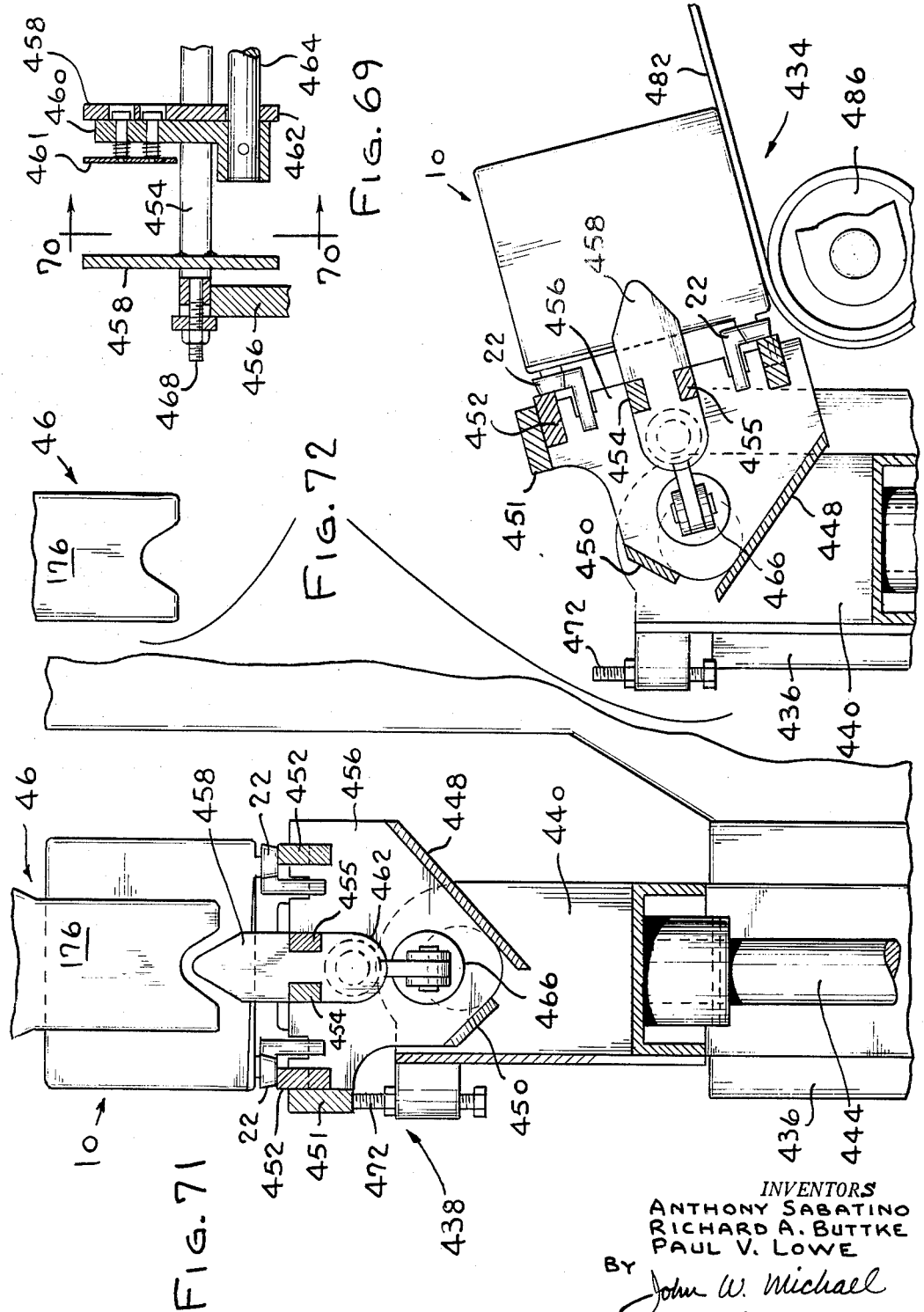

May 31, 1966 A. SABATINO ETAL 3,253,306
MACHINE FOR MAKING STORAGE BATTERY ELEMENTS
Filed Dec. 30, 1960 40 Sheets-Sheet 40

INVENTORS
ANTHONY SABATINO
RICHARD A. BUTTKE
PAUL V. LOWE
BY John W. Michael
ATTORNEY United States Patent Office 3,253,306
Patented May 31, 1966

3,253,306
MACHINE FOR MAKING STORAGE BATTERY
ELEMENTS
Anthony Sabatino, Richard A. Buttke, and Paul V. Lowe, Milwaukee, Wis., assignors to Globe-Union Inc., Milwaukee, Wis., a corporation of Delaware
Filed Dec. 30, 1960, Ser. No. 79,728
11 Claims. (Cl. 22—58)

This invention relates to a machine for fabricating elements for a storage battery and more particularly to a machine designed to fabricate a storage battery element in accordance with the method described and claimed in copending application Serial No. 813,865, filed May 18, 1959, now Patent No. 3,087,005 and assigned to the assignee of this application.

The principal object of this invention is to provide a machine which will fabricate an element in accordance with the above application at a maximum rate of production and with a minimum amount of operator attention.

Another object is to provide a machine which will produce elements of high quality with a minimum number of rejects.

Another object is to provide a machine which can be readily adjusted to accommodate stacks of various sizes.

A final object is to provide a machine having the above characteristics which although providing a high degree of automatic operation is of relatively simple construction and occupies a relatively small amount of floor space.

Other objects and advantages will be pointed out in, or be apparent from the specification and claims, as will obvious modifications of the single embodiment shown in the drawings, in which:

FIG. 1 is a perspective view of two plates and a separator of a battery stack;

FIG. 1a is a side elevation view of a battery element with parts broken away;

FIG. 1b is a sectional view taken along line 1b—1b of FIG. 1a;

FIG. 2 is a top plan view of the transfer mechanism of the machine showing the load and alignment station, flux station, casting station and unloading station in dotted lines;

FIG. 2a is a side elevation view of the machine shown in FIG. 2 as viewed from the load and alignment station;

FIG. 3 is a horizontal sectional view taken along line 3—3 of FIG. 2a;

FIG. 5 is a side elevation view of the load and alignment mechanisms, with the alignment box in position to receive stacks from the loader;

FIG. 6 is an elevation view of the load mechanism taken along line 6—6 of FIG. 5;

FIG. 7 is a fragmentary side elevation view of the loader showing the stacks in loaded position;

FIG. 8 is a side elevation view similar to FIG. 7 but with the alignment box pivoted to receiving position;

FIG. 9 is a view similar to FIG. 8 but showing the relationship of the loader and alignment box when the machine has been modified to handle stacks of reduced width;

FIG. 10 is a fragmentary plan view taken along line 10—10 of FIG. 5;

FIG. 11 is a sectional view taken along line 11—11 of FIG. 10;

FIG. 12 is a sectional view taken along line 12—12 of FIG. 10;

FIG. 13 is a fragmentary plan view taken along line 13—13 of FIG. 5 with certain parts broken away;

FIG. 14 is a sectional view taken along line 14—14 of FIG. 13;

FIG. 15 is a view similar to FIG. 14 but with the machine modified to handle stacks of reduced width;

FIG. 17 is a vertical sectional view taken along line 17—17 of FIG. 16;

FIG. 18 is a horizontal sectional view taken along line 18—18 of FIG. 16;

FIG. 19 is a top plan view of the alignment box with the box pivoted to an upright position for transferring the stacks to a transfer head;

FIG. 20 is a sectional view taken along line 20—20 of FIG. 19;

FIG. 21 is a fragmentary view of a portion of the alignment box shown in FIG. 19 showing how the box is modified to receive stacks of narrower width;

FIG. 22 is a fragmentary side elevation view of the alignment box taken along line 22—22 of FIG. 19 with parts broken away;

Figure 34:
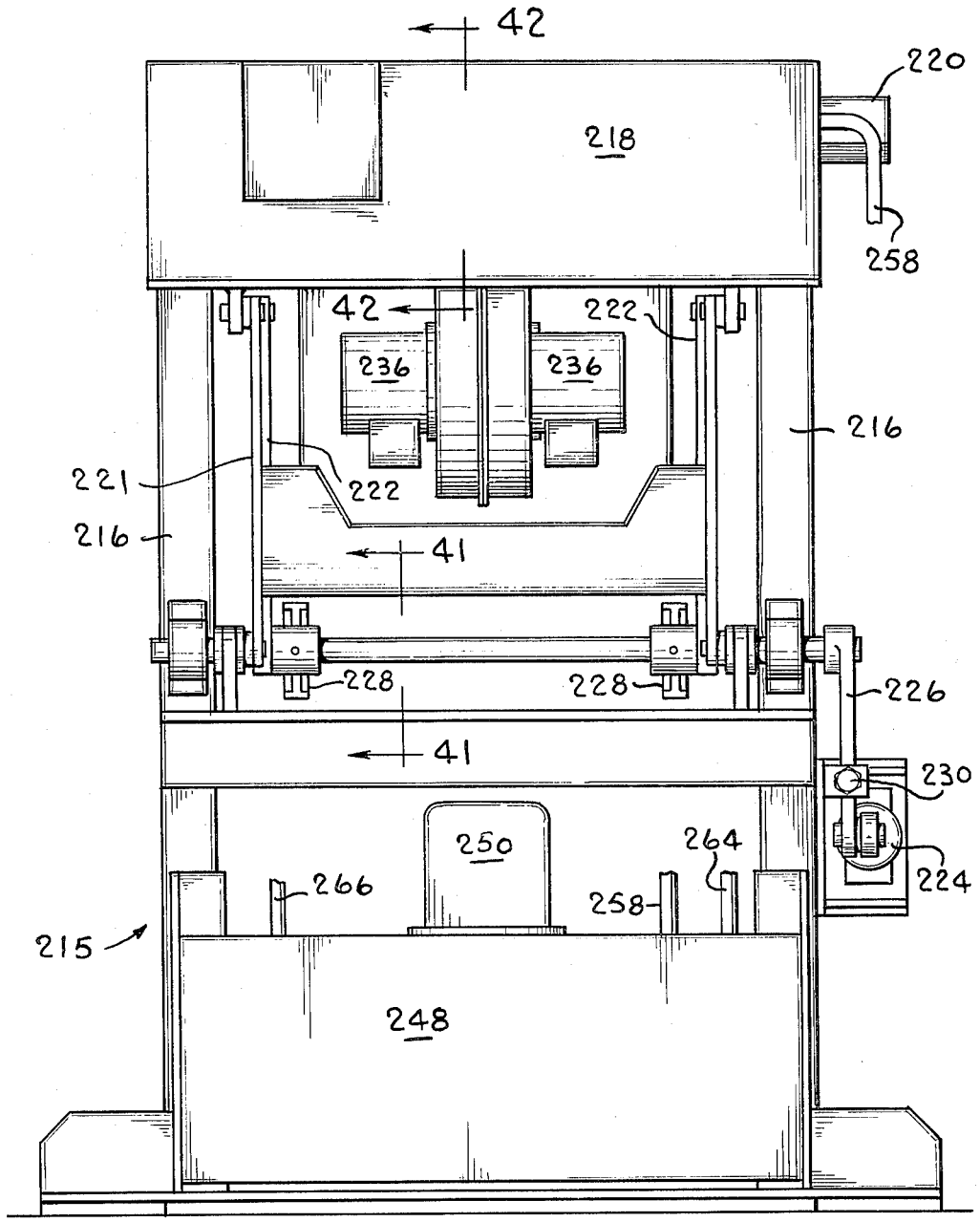
Figure 35:
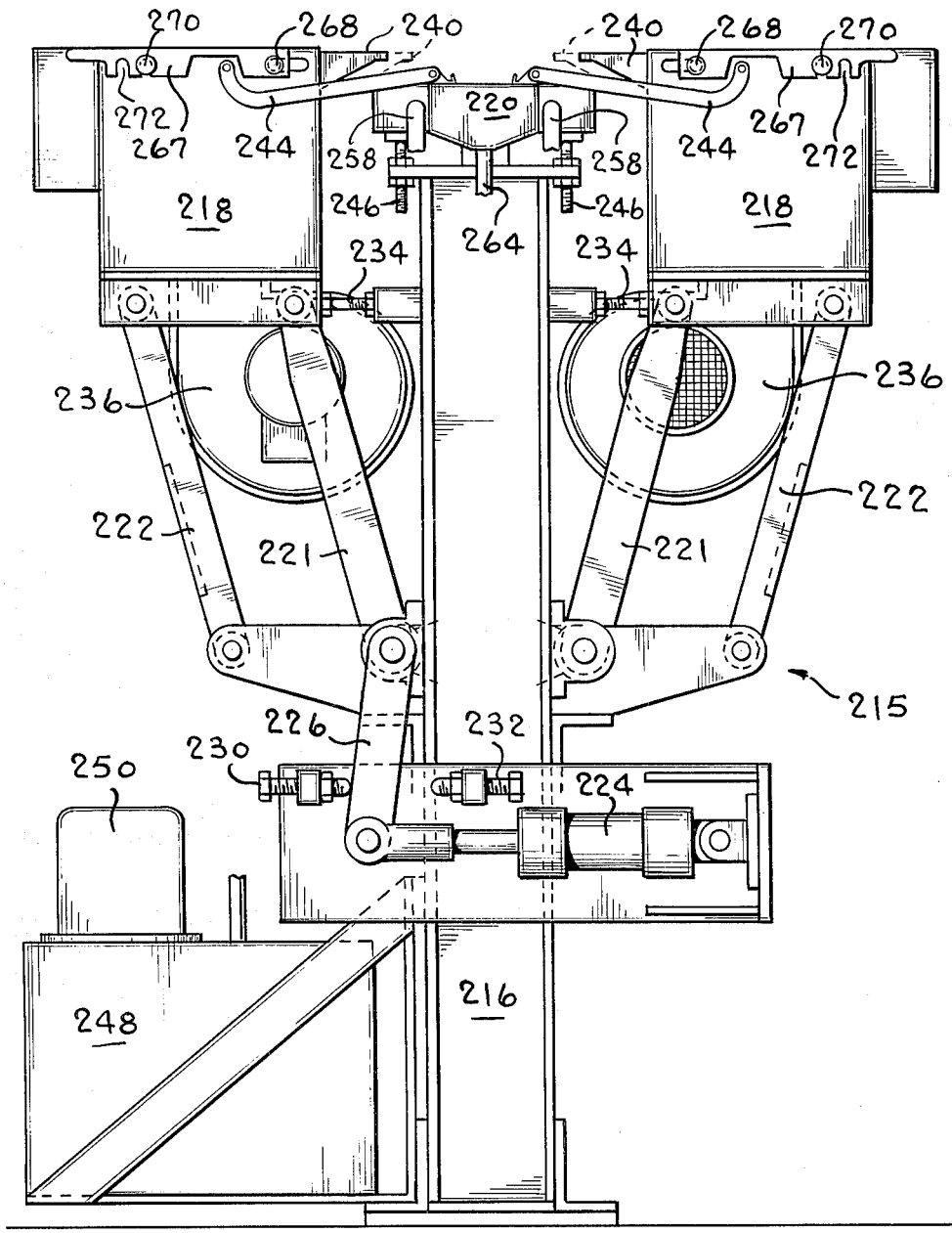
Figure 42:
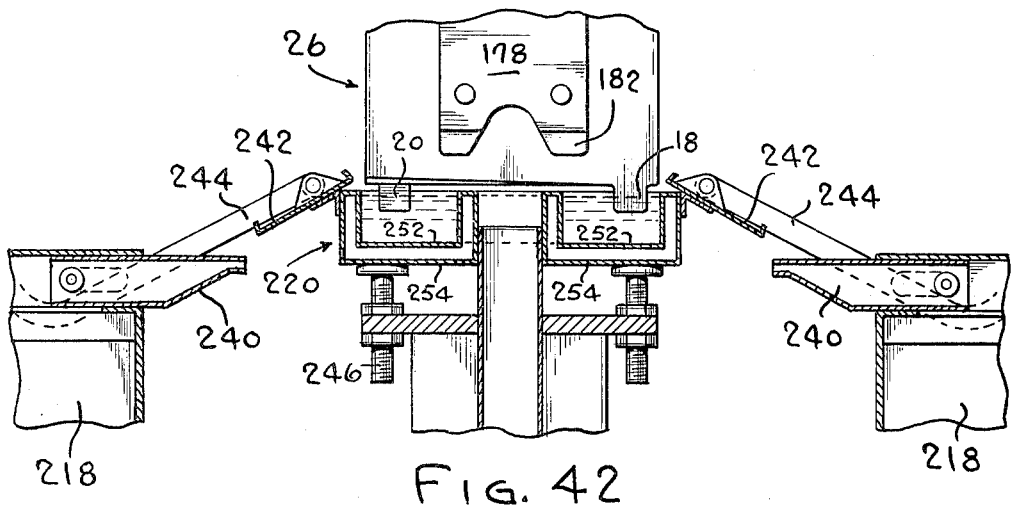
Figure 43:
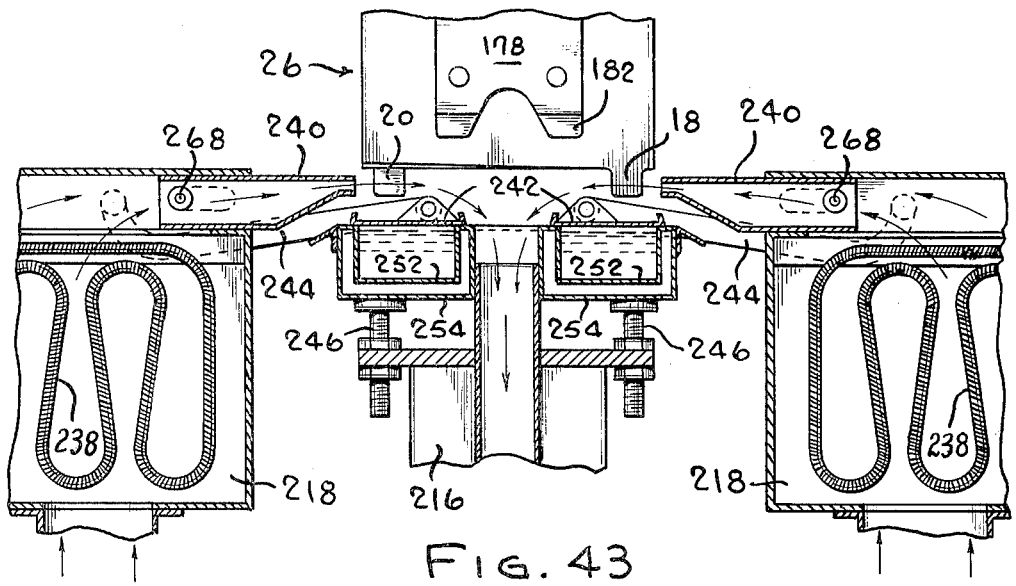
Figure 41:
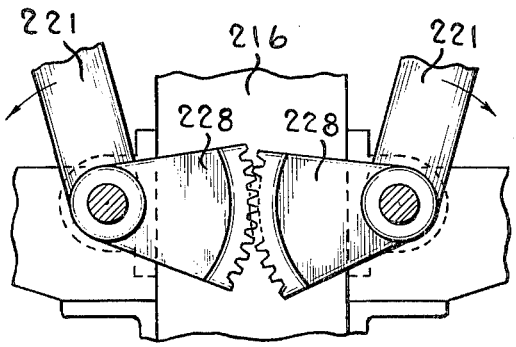
Figure 44:
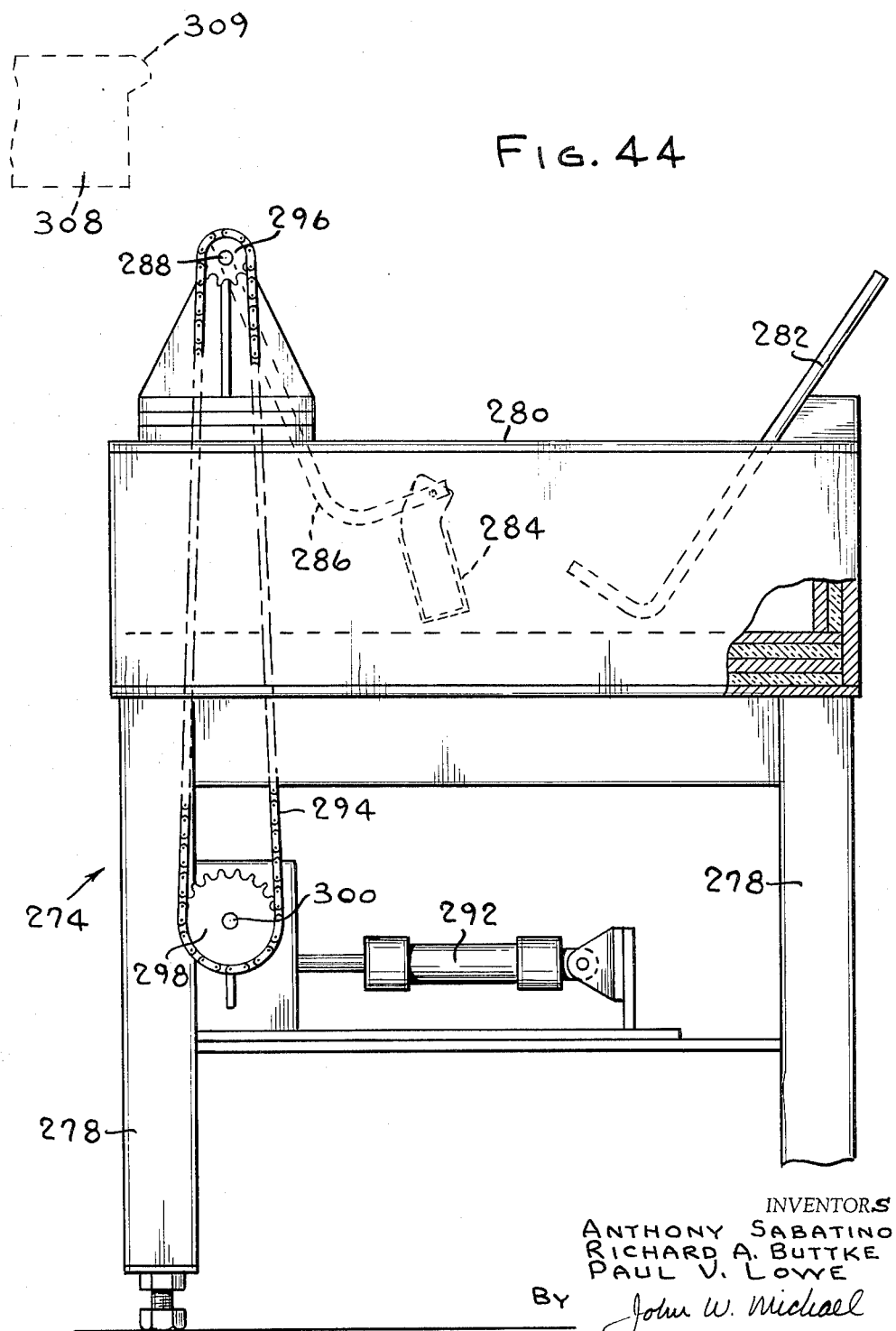
Figure 45:
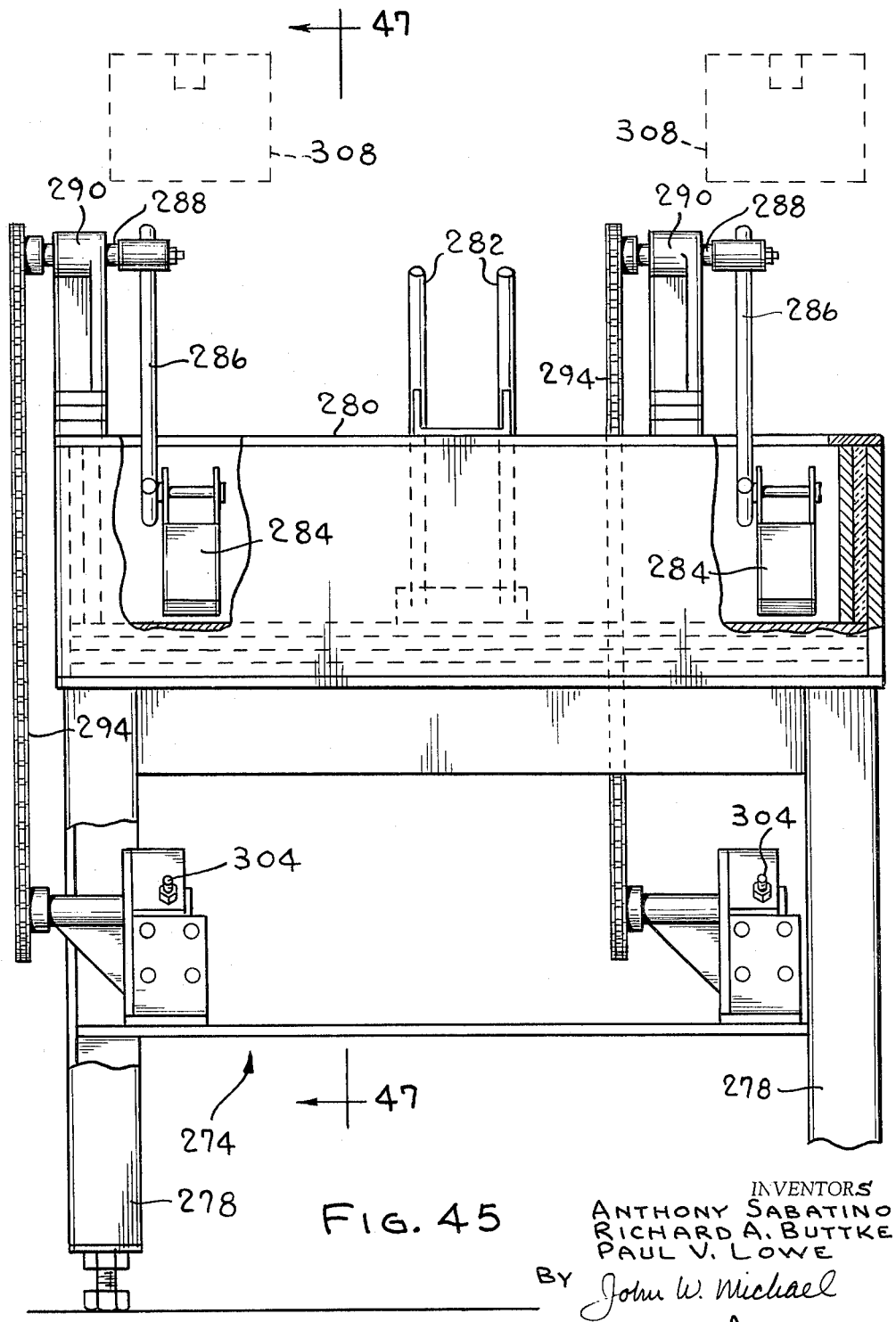
Figure 46:
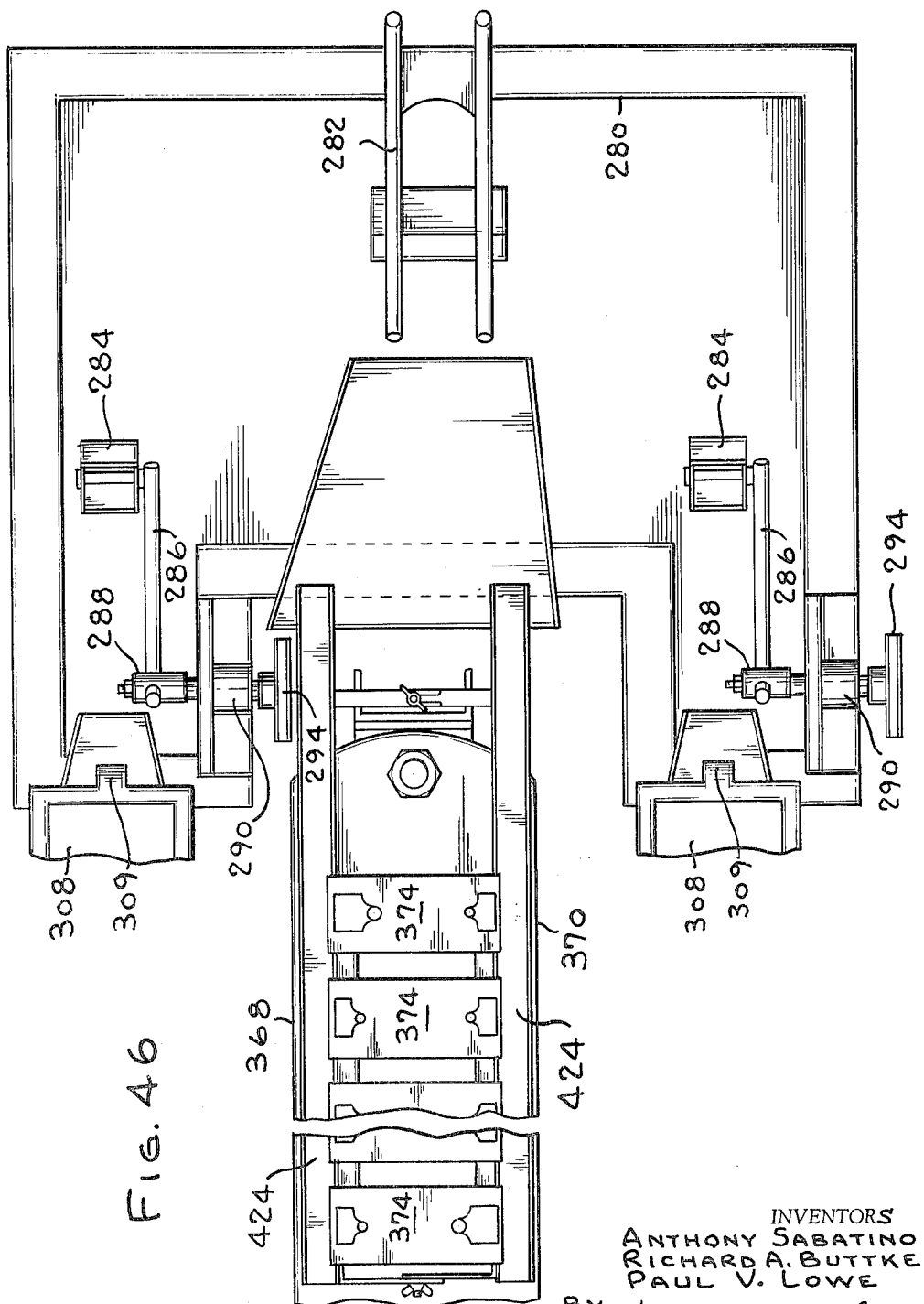
Figure 47:
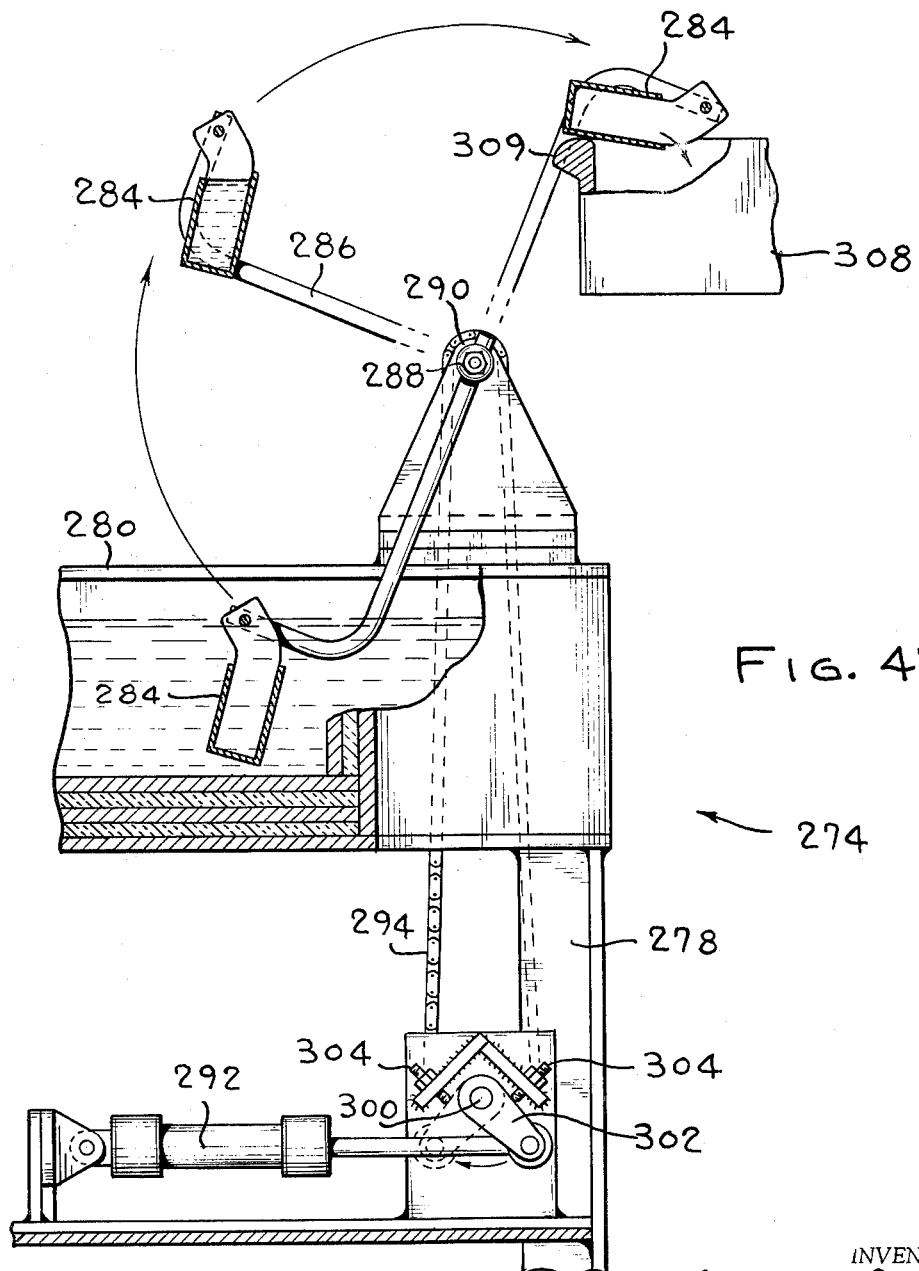
Figure 48:
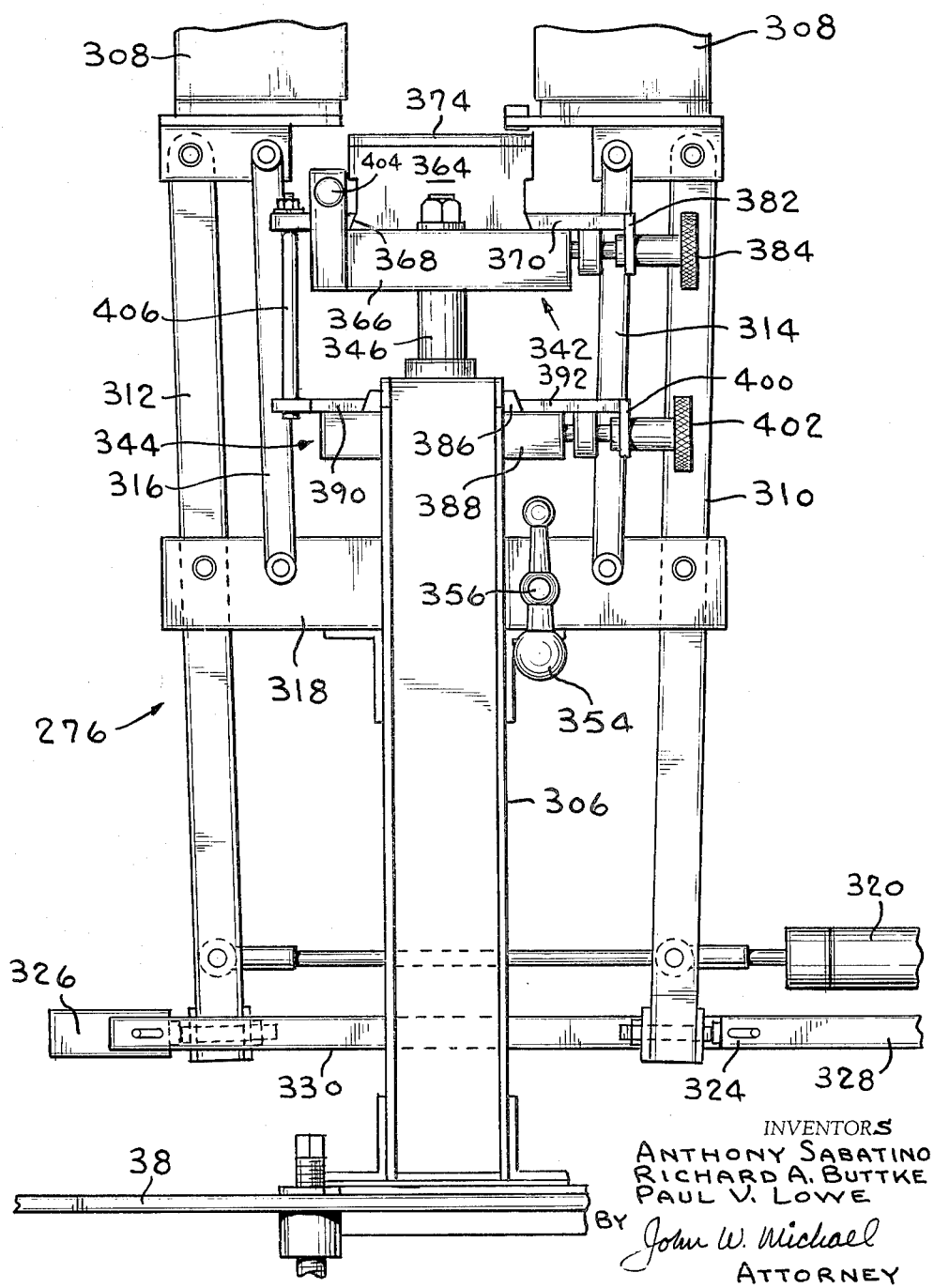
Figure 49:
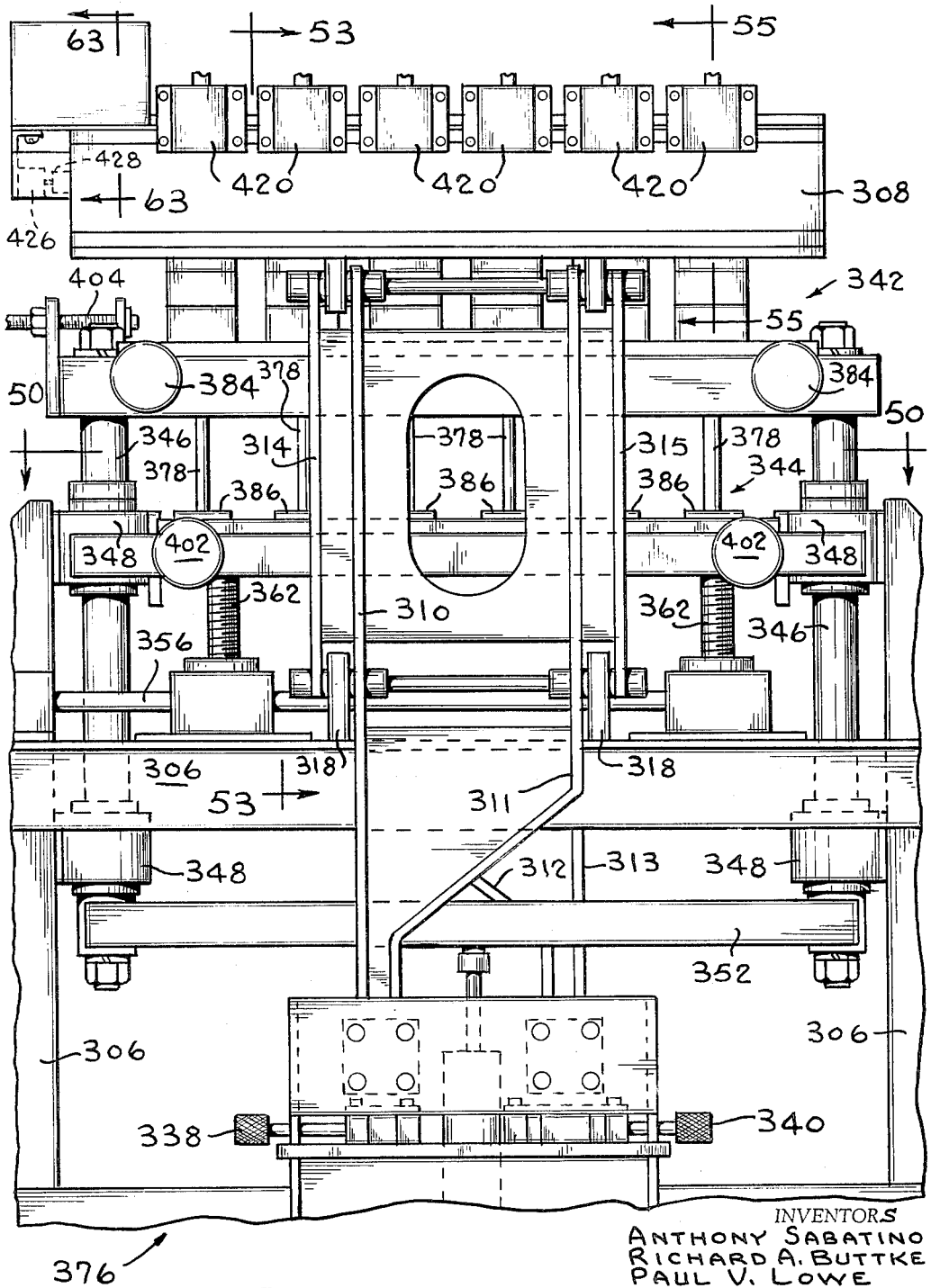
Figure 53:
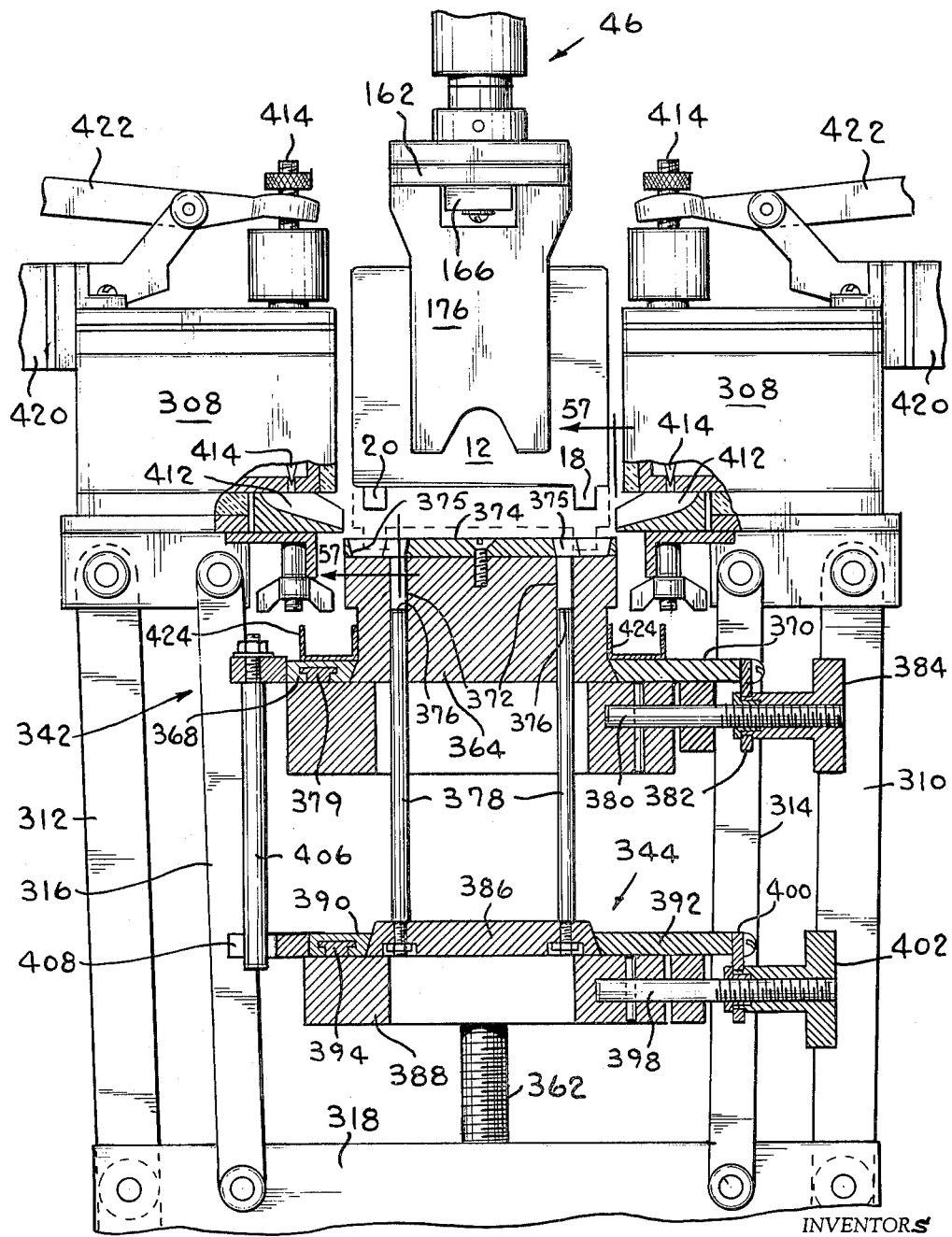
Figure 54:
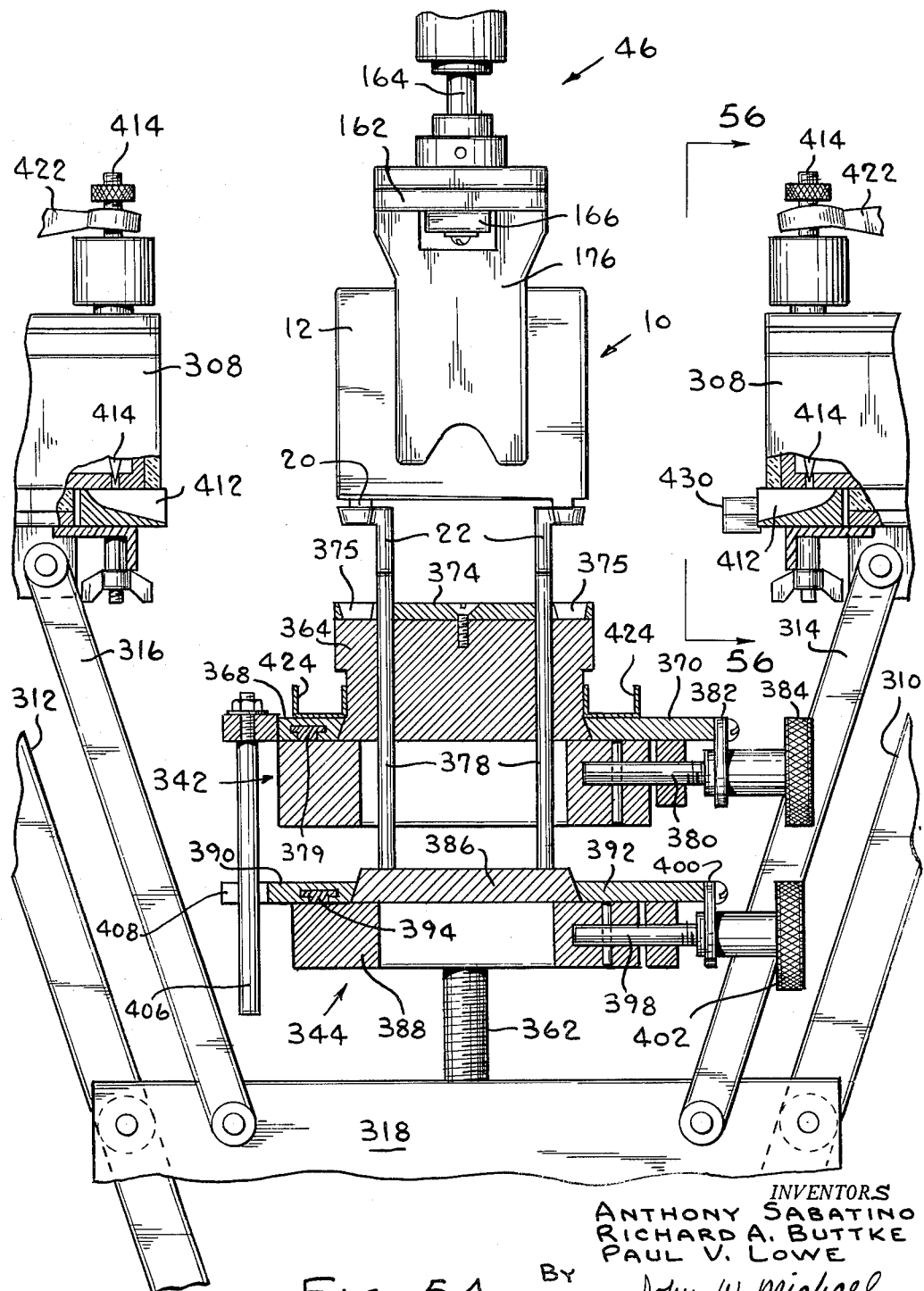
Figure 55:
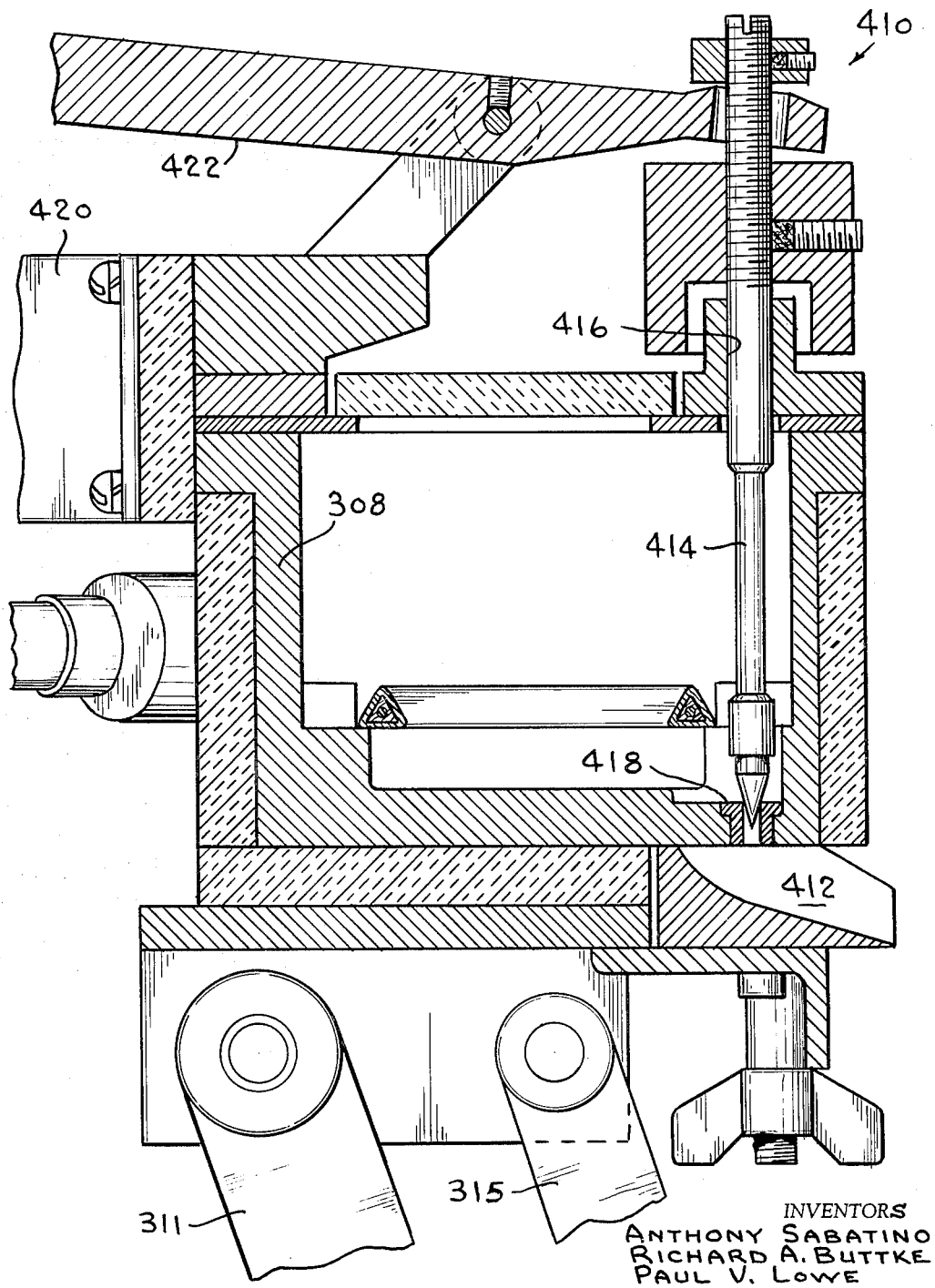
Figure 64:
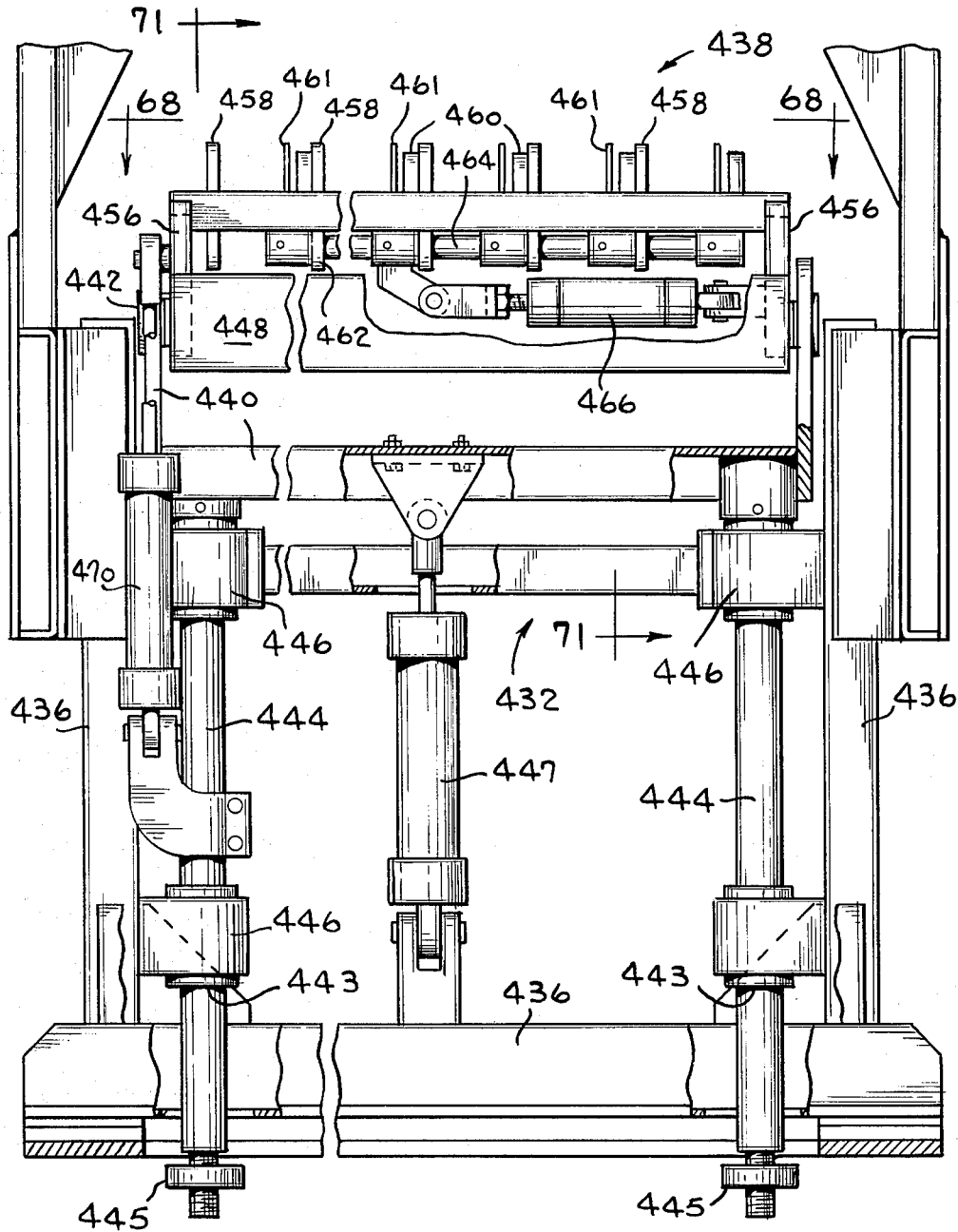
Figure 73:
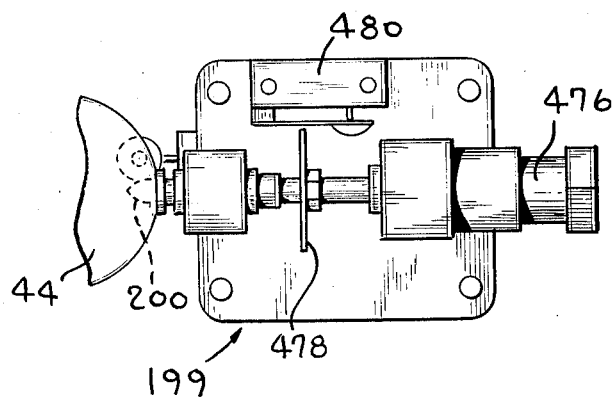

FIGS. 23 and 24 are sectional views taken along lines 23—23 and 24—24, respectively, of FIG. 22;

FIG. 25 is an elevation view of a transfer head mounted on the end of one of the transfer arms;

FIGS. 26, 27 and 28 are sectional views taken along lines 26—26, 27—27, and 28—28, respectively, of FIG. 25;

FIG. 29 is a fragmentary end view of the transfer head shown in FIG. 25;

FIG. 30 is a bottom plan view of the slidable clamping bar on which the movable clamping plates of the transfer head are mounted;

FIG. 31 is a sectional view taken through the transfer head and alignment box showing the parts in position to transfer the stacks;

FIG. 32 is a fragmentary rear elevation view of a transfer head and alignment box prior to transfer of the stacks;

FIG. 33 is a view similar to FIG. 32 showing the head and box in position after the stacks have been transferred from the box to the transfer head;

FIG. 34 is a side elevation view of the flux and preheat apparatus at the flux station;

FIG. 35 is an end elevation view of the apparatus shown in FIG. 34;

FIG. 36 is a fragmentary top elevation view of the apparatus shown in FIG. 34 with the left hand portion showing the heater boxes retracted and the covers closed and the right hand portion showing the heater boxes extended with the covers open;

FIGS. 37, 38, 39 and 40 are sectional views taken along lines 37—37, 38—38, 39—39 and 40—40, respectively, of FIG. 36;

FIG. 41 is a sectional view taken along line 41—41 of FIG. 34;

FIG. 42 is a sectional view taken along line 42—42 of FIG. 34;

FIG. 43 is a view similar to FIG. 42 but showing the flux tray covers closed and the heater boxes retracted to preheat position;

FIG. 44 is a side elevation view of the lead supply apparatus with parts broken away;

FIG. 45 is a front elevation view of the apparatus shown in FIG. 44;

FIG. 46 is a top plan view of the apparatus shown in FIG. 44;

FIG. 47 is a vertical sectional view taken along line 47—47 of FIG. 45 with parts broken away;

FIG. 48 is a fragmentary end elevation view of the casting apparatus;

FIG. 49 is side elevation view of the casting apparatus shown in FIG. 48;

FIG. 50 is a horizontal sectional view taken along line 50—50 of FIG. 49;

FIG. 51 is a fragmentary top plan view of the casting apparatus shown in FIG. 48;

FIG. 52 is a sectional view taken along line 52—52 of FIG. 50;

FIG. 53 is a sectional view taken along line 53—53 of FIG. 49;

FIG. 54 is a view similar to FIG. 53 but showing the casting pots pivoted away from the molds;

FIG. 55 is an enlarged sectional view taken along line 55—55 of FIG. 49;

FIG. 56 is a fragmentary elevation view taken along line 56—56 of FIG. 54;

FIG. 57 is a sectional view taken along line 57—57 of FIG. 53;

FIG. 58 is a sectional view taken along line 58—58 of FIG. 56;

FIG. 59 is an end elevation view similar to FIG. 48 but with parts broken away;

FIG. 60 is a sectional view taken along line 60—60 of FIG. 59;

FIG. 61 is a sectional view taken along line 61—61 of FIG. 59;

FIG. 62 is a sectional view taken along line 62—62 of FIG. 59;

FIG. 63 is a sectional view taken along line 63—63 of FIG. 49;

FIG. 64 is a fragmentary front elevation view of the unloading apparatus (with parts broken away);

FIG. 65 is a fragmentary front elevation view of the top portion of the apparatus shown in FIG. 64;

FIGS. 66 and 67 are side elevation views of the bottom and top portions of the apparatus shown in FIG. 64;

FIG. 68 is a top plan view of the unload apparatus taken along line 68—68 of FIG. 64;

FIG. 69 is a sectional view taken along line 69—69 of FIG. 68;

FIG. 70 is a sectional view taken along line 70—70 of FIG. 69;

FIG. 71 is a sectional view taken along line 71—71 of FIG. 64;

FIG. 72 is a view similar to FIG. 71 but with the unloading head pivoted into position to discharge the stacks from the head to the take-off conveyor;

FIG. 73 is a top plan view of the mechanism shown in FIG. 67; and

Figure 74:
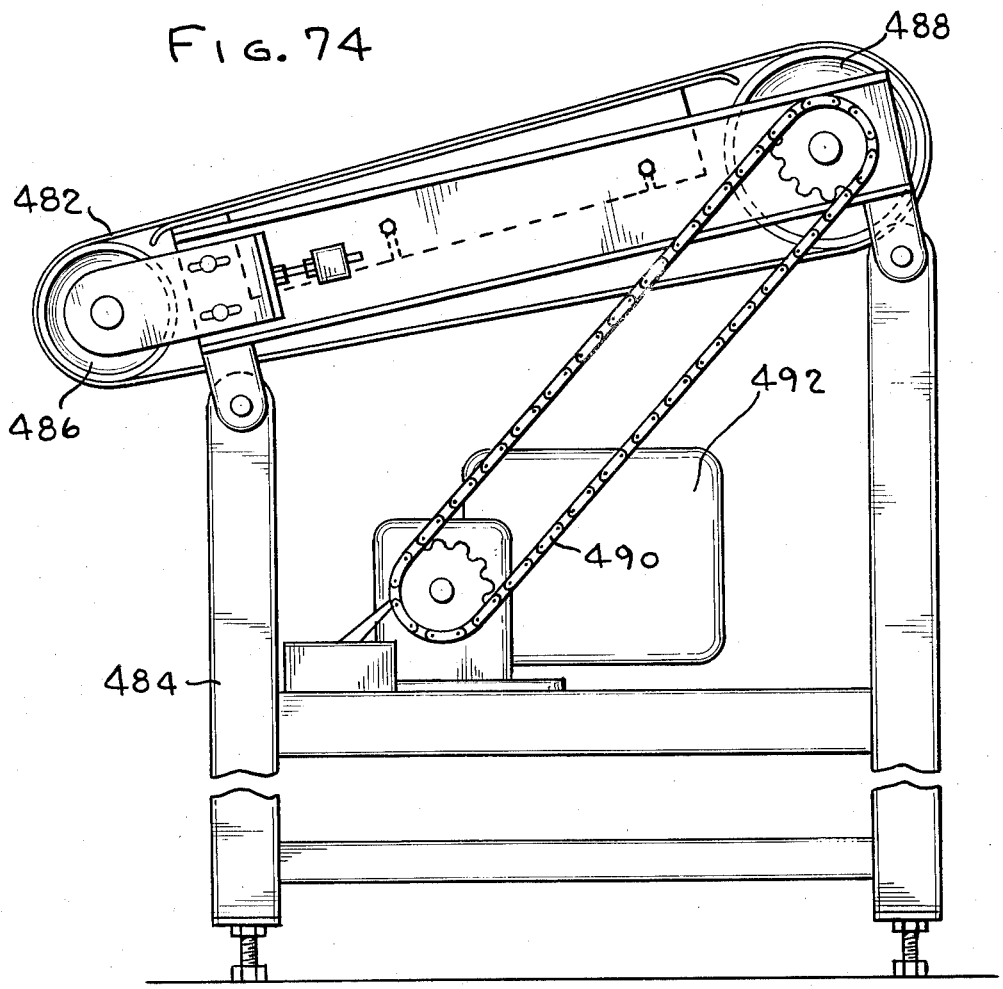

FIG. 74 is a side elevation view of the take-off conveyor.

The machine of this invention is designed for fabricating storage battery elements 10 of the type shown in FIGS. 1, 1a and 1b. Each element 10 is comprised of negative and positive plates 12 and 14, respectively, alternately arranged between suitable separators 16. Plates 12 and 14 have lugs 18 and 20, respectively, to which post straps 22 and 24 are welded to form a complete element.

The post of strap 24 serves as one of the battery terminals (positive) and is therefore heavier and longer than the post of strap 22. The plates and separators prior to attachment of the post straps are generally referred to as "stacks" and will hereinafter be identified by the reference numeral 26.

As explained in copending application Serial No. 813,865, there are four major steps in the improved method described in such application for making a storage battery element.

The first step is to accurately align the stack. The second is the application of a suitable flux to the lugs of the plates. The third is the preheating of the lugs, and the fourth is the combined casting and welding operation wherein suitable post straps are cast onto the lugs.

A machine for performing the above steps is the subject matter of this application. The machine includes a stack transferring mechanism 28 (FIGS. 2, 2a, 3 and 4) adapted to transfer a plurality of stacks 26 between a load and alignment station 30, a flux and preheat station 32, a casting station 34 and an unload station 36 (shown in dotted lines on FIG. 2).

Figure 4:
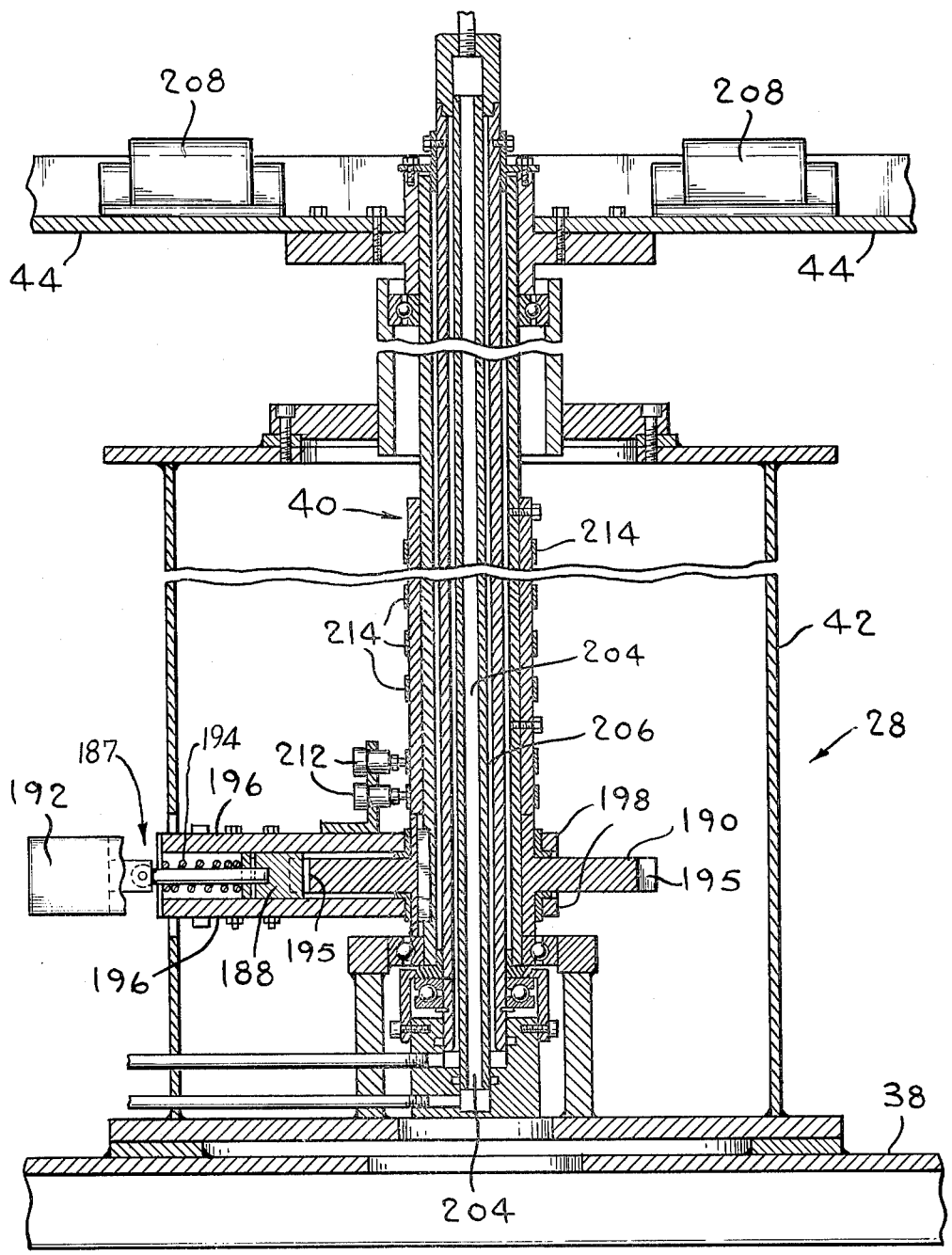
FIG. 4 is a vertical sectional view taken along line 4—4 of FIG. 3.

The stack transferring mechanism 28 is mounted on a platform base 38 and includes a central column 40 rotatably mounted in a column support structure 42 as shown in FIG. 4. Four equally angularly spaced radially extending transfer arms 44 are mounted on the upper end portion of column 40. At the end of each transfer arm 44 is mounted a transfer head 46 adapted to pick up a plurality of stacks 26 and transfer them between stations. The four transfer heads 46 are of identical construction and are shown in detail in FIGS. 25–30 and will be described hereinafter.

The machine shown in the drawings is set up to handle a batch of six (6) stacks of plates and separators which, when fabricated into elements, form a complete set of elements for use in the six cells of a 12-volt storage battery. It should be understood, however, that the machine can be modified to handle various numbers and types of stacks. As will presently be described, the specific embodiment of the machine disclosed herein is designed to handle stacks of different widths.

*Load and alignment station*

The fabrication of elements 10 begins at the load and alignment station 30 at which location are mounted a load mechanism and an alignment mechanism indicated generally by numerals 48 and 50, respectively, and shown in FIGS. 5–33.

Loader 48 (FIGS. 5 and 6) includes a support frame 52 on which is mounted a loading head 54. Loading head 54 (FIGS. 10 and 11) comprises a pair of spaced inclined base plates 55 and a plurality of spaced stationary plates 56 and adjustable plates 58 which form six loading compartments into which stacks 26 are manually inserted. Stationary plates 56 are supported on base plates 55 and have apertured lower portions 59 which extend down between plates 55 to slidably support an adjustment rod 60. Adjustable plates 58 are pinned to adjustment rod 60 and are provided with spring facing members 62 to hold the stacks in place between the plates. The spacing of plates 56 and 58 can be adjusted by means of a knob 64 threaded on the end of rod 60 to adjust the loader to accommodate stacks of varying thicknesses.

The stacks 26 are inserted between plates 56 and 58 and are held therein against a movable stop member 66 (FIG. 7) in position for loading into the alignment mechanism 50.

Alignment mechanism 50 (FIGS. 5 and 16) includes a support frame 68 mounted on the main platform base 38 and an alignment box 70 mounted on the frame.

Alignment box 70 (FIGS. 16 and 17) is pivotally mounted on a U-shaped support member 72 supported on a pair of posts 74, 74, which, in turn, are slidably mounted in bearing blocks 76 fastened to frame 68. Alignment box 70 (FIG. 14) is comprised of cross support members 78, 80, 82 fastened between side plates 84, 84 which, in turn, are pivotally mounted on member 72 by pins 86. On top of the pivoted support structure formed by the cross supports and side plates is mounted a plurality of spaced stationary and movable clamping plates 88 and 90, respectively (FIG. 13). Plates 88 are mounted in grooves in cross support members 92 and 94 which, in turn, are fastened to vibrating bars 96, 96 pivotally connected to member 82 by pins 98 as shown in FIG. 14. The compartments into which the stacks are loaded for alignment are completed by front and rear plates 100 and 102, respectively, and end plates 104, as shown in FIG. 13.

Clamping plates 88 and 90 are cut out centrally as shown in FIG. 24 and stationary plates 88 have lugs 106 which extend down into the space between cross members 92 and 94. A clamping rod 108 is slidably mounted in aligned openings in lugs 106 and operatively connected to a clamping cylinder 110 mounted beneath the rod 108 as shown in FIG. 22. Movable plates 90 are fastened to fittings 112 which, in turn, are pinned to rod 108 so that the plates can be clamped together by cylinder 110. The spacing of plates 88 and 90 when in open position to receive stacks 26 can be adjusted by means of an adjusting pin 111 having a knob 113 threadedly mounted on one end plate 104 as shown clearly in FIG. 20. Cylinder 110 and the other actuating cylinders referred to hereinafter can be either hydraulically or pneumatically operated. In the preferred embodiment of the invention, however, all actuating cylinders are hydraulically operated.

A pair of spaced alinment rods 114, 114 extend between end plates 104 (FIGS. 19 and 24) which, together with front plate 100, serve to support stacks 26 when received from load head 54 as will presently be described. Rods 114 are held in position by tabs 116 (FIG. 23) which can be raised to allow the rods to be removed and replaced in a different spaced relationship to accommodate stacks of different width. The alignment box is also equipped with an alignment bar 118 which extends parallel to rods 114 and aids in the alignment of the stacks. The entire alignment box 70 can be raised and lowered vertically on frame 68 by a lift cylinder 119 connected between frame 68 and U-shaped support 72 as shown in FIG. 16.

Figure 16:
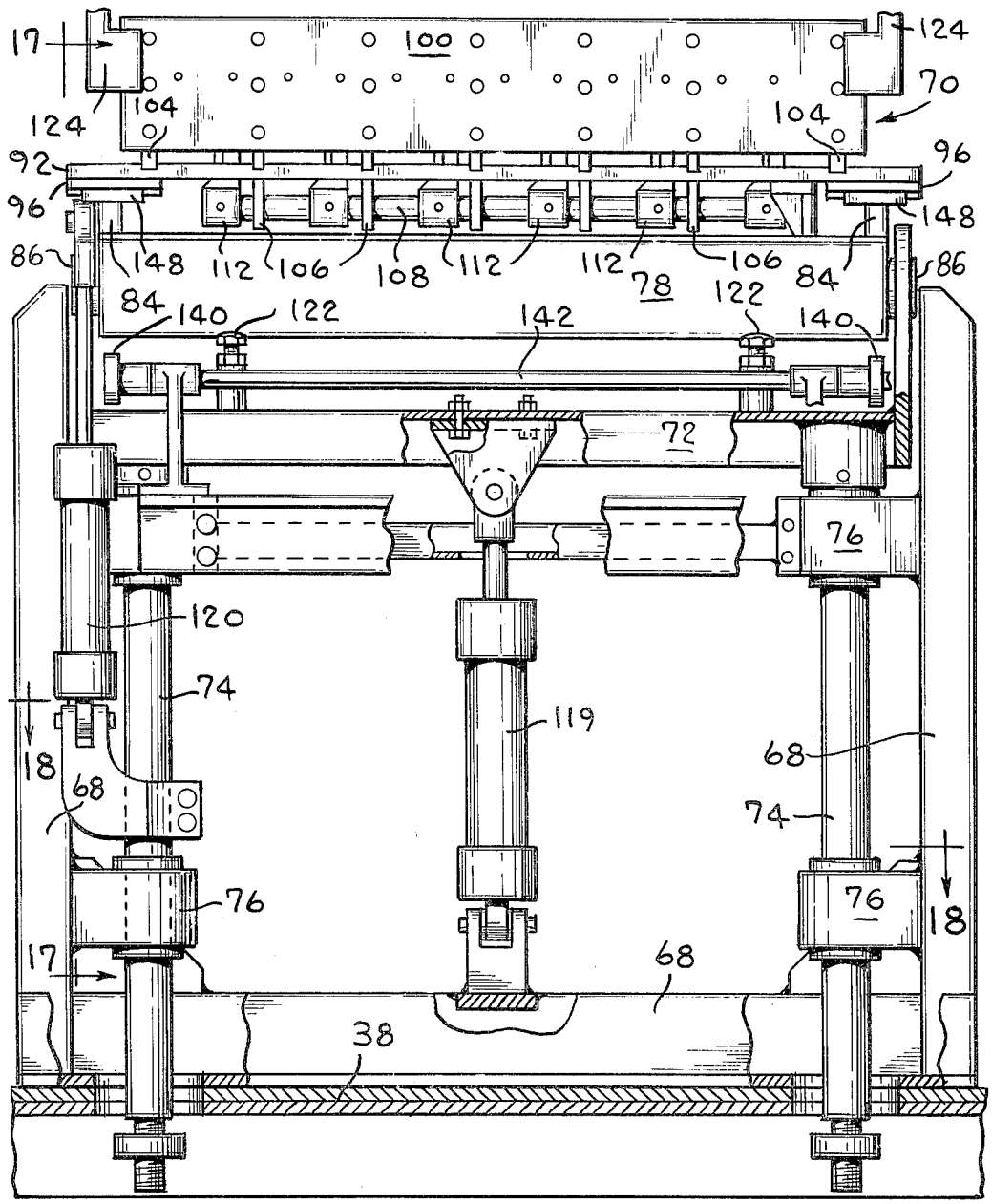
FIG. 16 is a front elevation view of the alignment mechanism as viewed from the operator's side with the loader mechanism removed and certain parts broken away.

After a batch of stacks has been loaded in load head 54, against stop bar 66 as shown in FIG. 7, alignment box 70 is pivoted to the aligning position shown in FIG. 5 by means of a tilting cylinder 120 mounted on one of the posts 74, as shown in FIG. 16. As box 70 is tilted into alignment position against adjustable stops 122 (FIG. 14), a pair of release fingers 124 mounted on front plate 100 will engage actuating lugs 128 pivotally mounted on the ends of stop bar 66 as shown in FIG. 12. Stop bar 66 will thereby be depressed against the bias of springs 126 (FIGS. 12 and 14). With the alignment box tilted to depress the stop bar, the stacks 26 are pushed manually from load head 54 into the alignment box 70 between stationary and movable clamping plates 88 and 90 where they will be supported by rods 114 and front plate 100.

After the stacks have been pushed into the alignment box, stop bar 66 can be released to allow loading of more stacks by pushing down on a release bar 130 having arms 132 pivotally mounted on the sides of the loader 48 as shown in FIGS. 7 and 8. Arms 132 have nose portions 134 adapted to engage lugs 128 and pivot the lugs out of engagement with fingers 124 and thereby allow stop bar 66 to be raised by springs 126. Tension springs 136 hold lugs 128 in contact with noses 134 and compression springs 138 serve to return arms 132 to raised position when bar 130 is released.

With the stacks in the alignment box the next operation involves vibration of the stacks to accurately align the plates and separators for further operations. This is accomplished by cams 140 mounted on a shaft 142 which is driven by a motor 144 through a gear box 146 (FIG. 5). Cams 140 when rotated ride in contact with pads 148 fastened to the ends of vibrator bars 96 to thereby oscillate the bars about pivot pins 98. As shown in FIG. 23, bars 96 are biased downwardly by springs 150 to thereby snap the stacks down sharply as pads 148 drop off the high points of cams 140 upon each rotation of the cams.

After the cams are rotated to vibrate the stacks, the aligned stacks are clamped securely in the vibrator box by energizing clamping cylinder 110. The alignment box 70 is then tilted back to its upright transfer position against adjustable stops 152 by energizing tilting cylinder 120. The stacks are now in position for transfer to a transfer head 46.

It should be noted at this point that the loader and alignment mechanisms are designed so that they can be readily modified to handle stacks of reduced width. Loader 48 is modified by simply actuating handle 154 of jack mechanism 156 from the position shown on the right hand side of FIG. 6 to that shown on the left hand side to thereby raise load head 54 with respect to the alignment box 70. The alignment box is modified by removing rods 114 from the position shown in FIG. 14 and installing them in the position shown in FIG. 15. Alignment bar 118 is also relocated as shown in FIGS. 14 and 15 and a spacer plate 158 is installed on front plate 100 as shown in FIGS. 15 and 21. With the above modifications the loader and alignment mechanisms can accommodate stacks 26(a) (FIG. 15) of reduced width. It will be noted in this regard that with load head 54 raised with respect to the alignment box 70, stop bar 66 will be depressed by a second pair of longer releasing fingers 160 fastened to plate 100 as shown in FIG. 9.

The construction details of a transfer head 46 are shown in FIGS. 25–30. Each head includes a stationary base plate 162 mounted on the ends of a pair of posts 164 which are mounted for vertical sliding movement at the ends of transfer arms 44. A clamping bar 166 (FIG. 30) is slidably mounted on the lower surface of plate 162 for actuating by a clamping cylinder 168 through an adjustable connection which includes a pin 170 engaged in a slot 172 in the end of bar 166 by a square nut 174 threaded on the end of the pin. Spaced stationary and movable clamping plates 176 and 178 are mounted on plate 162 and bar 166, respectively. The spacing of the clamping plates can be adjusted by adjusting the position of pin 170 in slot 172 by loosening and tightening the connection by turning knob 180 on pin 170. Movable clamping plates are provided with spring-mounted face plates 182. The entire transfer head 46 can be raised and lowered on arm 44 by an actuating cylinder 184 mounted on the top of each arm as shown.

By comparing FIG. 24 with FIGS. 26 and 27, it will be noted that the clamping plates of transfer head 46 are shaped to fit inside the cut-out portions of the clamping plates of the alignment box 70. Thus, with the alignment box in transfer position (FIG. 32) the alignment box is raised by energizing lift cylinder 119 and the transfer head 46 is lowered by energizing cylinder 184. This will move the box 70 and head 46 from the position shown in solid lines in FIG. 32 to that shown in solid lines in FIG. 31. With the parts in the FIG. 31 position, the stacks are transferred to head 46 by energizing cylinder 168 in the clamping direction and energizing cylinder 110 in the release direction. The head 46 is then raised and the box 70 is lowered by energizing cylinders 184 and 119, respectively, to the position shown in FIG. 33. The aligned stacks thus transferred from box 70 to head 46 are now ready to be indexed to the next station.

The transfer mechanism 28 is indexed between stations by an indexing mechanism 185 (FIG. 3) including an indexing cylinder 186 mounted on column support 42 as shown in FIG. 3. Cylinder 186 is operatively connected to a solenoid actuated latch mechanism 187 which includes a latch pin 188 which is actuated in and out of engagement with a notched ring member 190 by a solenoid 192 and a return spring 194. Ring 190 is fixed to column 40 and has four notches 195 equally angularly spaced around the periphery of the ring. Latch mechanism 187 is rotatably mounted on column 40 by means of brackets 196 and 198 clamped to the column. To index the machine, solenoid 192 is energized to withdraw latch pin 188 from a notch 195. Cylinder 186 is then energized to rotate the latch mechanism counterclockwise on column 40 as viewed in FIG. 3 until the mechanism reaches the position shown in dotted lines wherein latch pin 188 will come into register with the next notch 195 and be engaged therein by spring 194. Cylinder 186 is then energized in the opposite direction to return it to its FIG. 3 position to thereby rotate ring 190 (and column 40) 90 degrees in a clockwise direction. This will carry the stacks from the load and alignment station 30 to the flux station 32. The transfer mechanism is accurately positioned after each indexing by a locating mechanism 199 which includes solenoid operated locating pin 200 (FIGS. 67 and 73) mounted at unload station 36 and adapted for engagement with openings 202 in the end of transfer arms 44 as will be described in more detail hereinafter.

As shown in FIG. 4, fluid under pressure for operation of cylinders 168 and 184 of the transfer mechanism is carried to such cylinders through passageways 204 and 206 in column 40. The fluid pressure in cylinders 168 and 184 is controlled by pairs of control valves 208, 210 mounted on arms 44 as shown in FIG. 2. Also as shown in FIG. 4, a plurality of micro switches 212 mounted on latch mechanism 187 rotate in contact with cam strips 214 on column 40 to perform certain control functions for the machine.

*Flux and preheat station*

The next step is the application of a suitable flux to the lugs 18 and 20 of the plates which make up stacks 26. As explained in copending application Serial No. 813,865, the use of a suitable flux insures proper fusion of the post straps 22 and 24 to the lugs by the "cast-on" method without extensive prior cleaning of the plates and/or the close maintenance of critical lead, mold and plate temperatures.

The automatic fluxing and preheat mechanism 215 is shown in FIGS. 35–43 and includes a frame 216 having a pair of heater boxes 218 and a flux tray 220 mounted thereon. Heater boxes 218 are pivotally mounted for movement in and out from frame 216 by pairs of arms 221, 222. The boxes are pivoted on the frame by a pivoting cylinder 224 operatively connected to the left hand arm 221 by a link 226 as shown in FIG. 35. The motion of the left hand arm 221 is transmitted to the right hand arm by a pair of spur gear segments 228 as shown in FIG. 41. The movement of link 226 is limited by adjustable stops 230, 232 and the "retracted" or "preheat" position of boxes 218 is set by adjustable stops 234.

Each heater box 218 is provided with a blower 236, electric heating coils 238 and an adjustable nozzle 240 for preheating the plate lugs as will presently be described.

Flux tray 220 is provided with a pair of covers 242 connected to heater boxes 218 by arms 244 which are adapted to move the covers between an open position (FIG. 42) and a closed position (FIG. 43) as the heater boxes are pivoted on the frame by cylinder 224. The elevation of flux tray 220 can be adjusted by support bolts 246 on frame 216 as shown in FIGS. 42 and 43.

Flux is continuously circulated to tray 220 from a supply tank 248 by a flux pump 250 (FIG. 35). Tray 220 is comprised of spaced pairs of inner and outer containers 252 and 254, respectively, interconnected by a canal 256. Flux enters outer containers 254 through inlet conduits 258 (FIG. 38) and enters inner containers through openings 260 (FIG. 39). The flux recirculates from containers 252 over overflow weirs 262 (FIG. 37) and then down to the tank through a return conduit 264. A pair of drain conduits 266 are provided as shown in FIG. 39 to drain the tanks.

When the transfer head 46 carrying a batch of stacks 26 is indexed to the flux and preheat station 32, cylinder 224 has been energized to pivot heater boxes 218 outwardly away from frame 216 to thus move covers 242 to the open position as shown in FIG. 42 and the right-hand portion of FIG. 36. Flux is then applied to the lugs 18 and 20 of the plates by lowering the stacks to the position shown in FIG. 42 by energizing cylinder 184 of the transfer head mechanism shown in FIG. 25. The transfer head 46 and stacks 26 carried thereby are then raised to the position shown in FIG. 43 to facilitate the next step which is the preheating of the lugs.

Preheating occurs after heater boxes 218 have been pivoted to the preheat position shown in FIG. 43 (and in the left-hand portion of FIG. 36) by energizing cylinder 224. The retracting movement of the heater boxes will cause covers 242 to close over flux tray 220. Air heated by elements 238 is then blown across the lugs by blowers 236 which force air through openings in the bottom of the boxes across the heating elements therein and then through nozzles 240 onto the lugs. The hot air not only drives off the flux solvent but also acts to activate the flux to reduce part of the lead oxides on the lugs to free lead. The hot air also serves to preheat the lugs for the welding operation which follows.

Upon completion of the preheating step, blowers 236 are shut off and heater boxes are pivoted back out from the frame to permit indexing of the fluxed and preheated stacks to the casting station 34 and the indexing of a subsequent batch of stacks into the flux station.

It is noted that hot air nozzles 240 can be adjusted on the heater boxes for handling stacks 26(a) of reduced width. To make the adjustment, nozzle levers 267 (FIG. 35) are simply pivoted on pins 268, and then pushed inwardly towards the stacks until pins 270 can be engaged by notches 272 in the levers.

*Casting station*

The equipment located at casting station 34 includes a lead supply apparatus 274 (FIGS. 44–47) and a casting apparatus 276 (FIGS. 48–62).

Lead supply apparatus 274 is designed to supply molten lead to the casting apparatus at controlled intervals. Such apparatus includes a frame 278 having a molten lead retort 280 mounted thereon. Retort 280 has a loading rack 282 for loading lead ingots thereinto which are subsequently melted by heat produced by suitable heating elements (not shown) mounted in the retort. The molten lead in the retort is carried to the casting apparatus by ladles 284 pivotally mounted on arms 286. Each arm 286 is fastened to a shaft 288 journaled in a bearing 290 mounted on opposite sides of the retort.

Arms 286 are actuated by load cylinders 292 by means of a chain drive 294 connected between sprockets 296 on shaft 288 and sprockets 298 on drive shafts 300. Drive shafts 300 are rotated by links 302 connected to the cylinders and the travel of arm 286 is controlled by adjustable stops 304 adapted to engage links 302 as shown in FIG. 47.

From the foregoing it is seen that when molten lead is needed at a casting pot 308, a cylinder 292 is energized to rotate on arm 286 as shown by the arrows in FIG. 47 to thereby carry a ladle full of molten lead from the retort to the casting apparatus where they are dumped into a casting pot 308 for subsequent pouring of the molds as will presently be described. Dumping of the ladles is accomplished by the engagement of casting pot edges 309 with the ladles to thereby pivot them on arms 286 as shown in FIG. 47. The ladles are returned to the retort by the return stroke of cylinders 292. The operation of lead supply apparatus 274 is under the control of a pair of level sensitive switches 305, 307 mounted in the top of each casting pot 308 as shown in FIG. 63. When the level of molten lead drops below the end of switch 305 the load cylinder 292 for that pot will be energized to replenish the supply of lead in the pot. If for any reason the level continues to drop in the pot, switch 307 will open to energize a suitable warning device to alert the operator so the fault can be corrected.

Casting apparatus 276 (FIG. 48) is mounted on the main platform base 38 and includes a frame 306 having a pair of casting pots 308 movably mounted on either side of the frame by actuating arms 310, 311, 312, 313 and stabilizing links 314, 315, 316 and 317. Links 314–317 are pivotally connected between pots 308 and cross supports 318 on frame 306. Actuating arms 310–313 are pivotally mounted on supports 318 and pivotally connected at the upper ends to pots 308. The arms 310, 311, 312 and 313 are actuated to move pots between a pouring position (FIGS. 48 and 53) and a retracted position (FIG. 54) by pivoting cylinders 320, 322, respectively, operatively connected to the arms as shown in FIGS. 59–62. The movement of pairs of arms 310, 311 and 312, 313 into pouring position (FIG. 59) is limited by a pair of spring loaded stops 324, 326, respectively. Stops 324, 326 are supported on the ends of horizontal bar supports 328, 330, respectively. The detailed construction of stop 326 is shown in FIG. 62 and includes a stop pin 332 in engagement with a compression spring 334 and held in assembled position by a pin 336. Stop 324 is of identical construction.

The pouring position of pots 308 can be adjusted to handle stacks of reduced diameter by adjusting the rod supports 328, 330 as shown in FIG. 61. The rods are anchored to the frame by threaded pins 338, 340 which can be readily removed and replaced in the alternate openings in the rods to thereby change the position of stops 324, 326 with respect to the ends of actuating arms 310, 311 and 312, 313.

A mold assembly 342 and a knock-out pin assembly 344 are mounted on the central portion of frame 306 between casting pots 308 as shown in FIGS. 48 and 49. Mold assembly 342 is mounted for vertical movement above and with respect to the knock-out pin assembly by posts 346 slidably mounted in bearing blocks 348 fastened to the frame 306 (FIG. 49). The mold assembly is raised and lowered on the frame (relative to the knock-out pin assembly) by a lift cylinder 350 (FIG. 59) mounted on the frame and operatively connected to a horizontal support member 352 fastened between posts 346. The knock-out pin assembly 344 can be manually adjusted vertically on the frame by a knob 354 on a shaft 356 by means of worm gears 358 on shaft 356 in driving engagement with pinion gears 360 on threaded posts 362 (FIG. 59) on which the knock-out pin assembly is mounted.

Mold assembly 342 (FIGS. 51 and 53) includes a plurality of spaced mold blocks 364 mounted on a mold support member 366 and clamped thereon between bars 368 and 370. Each mold block 364 has two separate openings 372 therethrough for casting two post straps and is provided with a mold cap 374 having openings 375, which in combination with the top surfaces and openings in the mold blocks and the ends 376 of the knock-out pins 378 provide a closed cavity for casting the post straps of battery elements 10. The mold cavities of all molds are identical with the exception of the two end molds which have enlarged cavities adapted for casting the post straps having posts which serve as battery terminals in the finished battery.

The mold blocks 364 are clamped firmly against bar 368 (which is keyed to support member 366 by a keyway 379) by a pair of threaded pins 380 which are pinned to support member 366 and pass through retainer plates 382 on bar 370 so that the mold blocks can be clamped in place by knobs 384 threaded on the ends of pins 380.

Knock-out pin assembly 344 (FIGS. 50 and 53) includes a plurality of spaced knock-out pin blocks 386 (with knock-out pins 378) mounted on a knock-out pin support member 388 and clamped thereon between bars 390 and 392. Bar 390 is keyed to support 388 by a keyway 394. Blocks 386 are pinned to bar 390 by pins 396 (FIG. 52) to properly space the blocks and knock-out pins fastened therein which, in turn, space the mold blocks 364 by virtue of the engagement of knock-out pins 378 in openings 372 in the mold blocks.

The knock-out pin blocks 386 are clamped firmly between bars 390, 392 by a pair of threaded pins 398 which are pinned to support member 388 and pass through retainer plates 400 on bar 392 so that the blocks 386 can be tightened in place by knobs 402 threaded on the ends of pins 398 as shown in FIG. 53.

From the foregoing it will be seen that mold blocks 364 and knock-out pin blocks 386 can be readily removed and replaced by a different set simply by loosening and tightening knobs 384 and 402. It should also be noted that mold and knock-out pin blocks can be adjusted horizontally as a unit by an adjustment screw 404 threadably engaged with support member 366 and fastened to bar 368 as shown in FIG. 51. With the knobs 384 and 402 loosened, bar 368 can be moved on support 366 by turning screw 404. Movement of bar 368 will be transmitted to the knock-out pin blocks 386 by means of vertical rods 406 fastened at one end to bar 368 and engaged at the other end in notches 408 in bar 390. The horizontal movement of the knock-out pin blocks is then transferred to the mold blocks by the knock-out pins 378 engaged in opening 372.

Each casting pot 308 is provided with a bank of six solenoid operated valves 410 which are adapted to control the flow of molten lead from the pots through adjustable pouring spouts 412 and into the mold cap openings 375.

As shown in FIG. 55, valves 410 comprise a needle valve member 414 slidably mounted in an opening 416 for movement with respect to a valve seat 418. The needle valves 414 are actuated by solenoids 420 operatively connected to the valves by rocker arms 422.

A safety switch 426 (FIGS. 56, 58) having an actuating arm 248 is mounted on one pot 308 to prevent against pouring the molds if less than a full set of stacks 26 arrives at the station. The end stack on the operator's right is always loaded last so that arm 428 is positioned to sense the presence of such end stack and if none is there, solenoids 420 will not be energized.

Also as shown in FIGS. 56 and 57, a guide member 430 is provided adjacent each spout 412 to guide the stacks into proper position for welding.

When stacks 26 are indexed to the casting station, casting pots 308 are in the retracted position away from the mold and knock-out pin assemblies. After the stacks reach the casting station, the casting pots will be pivoted to pouring position (FIG. 53) by energizing cylinders 320, 322. The molds are then poured by energizing solenoids 420 for a specified period of time to allow a metered amount of molten lead to flow from the pots into the molds. As the pouring of the molds is about completed the transfer head is lowered by cylinder 184 which will lower the lugs of stacks 26 into the molten lead in openings 375 of the mold caps to thereby weld the plates to the post straps which have just been cast. Any lead that spills during pouring will be carried back to retort 280 by troughs 424 mounted on bars 368, 370 as shown in FIG. 46. The flux on the lugs further reacts with the oxides thereon reducing them to free lead and the active surface of the lugs fuses with the molten lead in the molds. Well fused welds are thus regularly made between lugs and post straps.

The post straps are allowed to harden in the molds and then the entire mold assembly 342 is lowered by cylinder 350 whereby the stationary knock-out pins 378 will force the post straps from the molds as shown in FIG. 54. The completed elements are then raised by transfer head cylinder 184, pots 308 are retracted, and the elements are indexed to the unloading station 36.

Unload station

The equipment located at unload station 36 includes an unload apparatus 432 and a take-off conveyor 434 as shown in FIGS. 64–74.

Unload apparatus 432 includes a support frame 436 mounted on the main platform base 38 and an unload head 438 mounted on the frame.

Unload head 438 is pivotally mounted on a U-shaped support 440 by pins 442. Support 440 is mounted on the top of a pair of posts 444, 444, which, in turn, are slidably mounted in bearing blocks 446 fastened to frame 436. The entire unload head 438 can be raised and lowered on frame 436 by means of a lift cylinder 447 (FIG. 64). The raised position of head 438 can be adjusted by adjustable stops 445 on the ends of posts 444.

Unload head 438 (FIG. 71) is comprised of cross support members 448, 450, 451, 454 and 455 fastened between end plates 456, 456 which in turn are pivotally mounted on support 440 by pins 442. Movable rest bars 452, 452 are supported between notches 453 in end plates 456 and are held in the notches by springs 457. To accommodate elements of different widths, bars 452 are simply moved from one notch to another from the position shown in FIG. 71 to that shown in FIG. 70. Unload head 438 also includes a plurality of spaced stationary and movable clamping plates 458 and 460, respectively. Stationary plates 458 are welded to spaced cross bars 454 and 455 and have apertured lower portions 462 adapted to receive a clamping rod 464 to which movable plates 460 are pinned as clearly shown in FIG. 69. Movable plates 460 are provided with spring loaded face members 461 as shown.

A clamping cylinder 466 mounted beneath rod 464 is operatively connected to the rod to clamp plates 458 and 460 together. The spacing of plates 458 and 460 when in open position to receive a set of elements can be adjusted to means of threaded pins 468 (FIG. 69) engaged with the ends of cross bars 454 and 455.

The unloaded head 438 is pivoted between an upright element receiving position (FIG. 71) to an unload position (FIG. 72) by means of a tilting cylinder 470 operatively connected between the left-hand post 444 (as viewed in FIG. 64) and an end plate 456 of the unload head 438. Adjustable stops 472 (FIG. 71) are provided to adjust the element receiving position of the head.

As shown in FIGS. 65, 67 and 73, the transfer arm locating mechanism 199 is mounted on the top portion 474 of the unloader frame 436. Each time the transfer mechanism 28 is indexed, a solenoid 476 of mechanism 199 is energized to retract locating pin 200 from opening 202 in the end of a transfer arm 44. When the next transfer arm 44 is indexed into position by indexing cylinder 186, solenoid 476 is again energized to extend pin 200 into an opening 202 and thereby accurately locate the four transfer arms and heads at the various stations of the machine. If for any reason the pin 200 does not enter 202 due to a slight misalignment, a member 478 on the pin will open a switch 480 as shown in FIG. 73. Actuation of switch 480 will shut down the machine until the transfer arm is properly aligned with pin 200, at which time the pin will engage completely with the opening to thereby release switch 480 and allow the machine to be started.

To transfer a batch of elements from a transfer head 46 to the unload apparatus 432, the unload head 438 is raised by cylinder 447 and the transfer head 46 is lowered by cylinder 184 to the respective positions shown in FIG. 71. The clamping cylinder 466 is then energized to clamp the elements in the unload head and the cylinder 168 of the transfer head is energized to release the elements therefrom. Both the transfer and unload heads are then returned to their former positions at which time the unload head is pivoted by tilting cylinder 470 to the position shown in FIG. 72, wherein the elements are deposited on a movable conveyor belt 482 of take-off conveyor 434. The elements are then released from the unload head by energizing clamping cylinder 466.

Take-off conveyor 434 includes a frame 484 having a continuous-type conveyor belt 482 mounted thereon by rollers 486, 488. The belt 482 is driven from a motor 490 by a chain drive 492. The motor is operated at controlled intervals so that as each batch of elements is deposited on the belt by unload head 438, they will be indexed a short distance towards the unloading end of the conveyor where they are removed from the conveyor. This permits the take-off conveyor to hold several batches of elements at the same time to thus facilitate a more orderly removal of the elements from the machine.

Operation

The operation of the machine is briefly as follows. The timing and sequence of operation of the various hydraulic cylinders, solenoids, etc. of the machine are controlled by a suitable electrical timing apparatus which is not a part of this invention and accordingly has not been described herein.

The fabrication of elements 10 begins at the load and alignment station 30. The assembled stacks 26 are inserted manually between plates 56 and 58 of loading head 54 and held therein against stop member 66 (FIG. 7) in position for loading into the alignment mechanism 50. For reasons to be explained hereinafter, the operator follows the practice of loading the far right-hand stack in the loading head 54 last.

After a batch of stacks have been loaded in load head 54 against stop bar 66, alignment box 70 of alignment mechanism 50 is pivoted into aligning position shown in FIG. 5 by tilting cylinder 120. As box 70 is tilted into aligning position, a pair of released fingers 142 will engage actuating lugs 128 on stop bar 66 to thereby depress the stop bar and allow the plates to be pushed manually from the loading head into the alignment box between stationary and movable clamping plates 88 and 90 where they will be supported by guide rods 114 and front plate 100. After the stacks have been pushed into the alignment box, stop bar 66 can be released to allow loading of another batch of stacks by depressing release bar 130.

With the stacks in the alignment box the next step is the vibration of the stacks to accurately align the plates and separators for further operations. This is accomplished by cams 140 driven by a motor 144 which function to vibrate the stacks up and down as the cams are rotated.

After the stacks have been aligned they are securely clamped in the vibrator box by energizing clamping cylinder 110. The alignment box is then tilted back to its upright or transfer position by tilting cylinder 120. The stacks are now in position for being transferred to a transfer head 46 of the transfer mechanism 28.

The stacks are transferred by raising the alignment box by energizing lift cylinder 119 and by lowering transfer head 46 by energizing cylinder 184 to thus move the box 70 and head 46 into the position shown in FIG. 31. The stacks are then transferred to head 46 by energizing clamping cylinder 168 thereof and energizing clamping cylinder 110 of the box 70 in the release direction. The head 46 is then raised and the box 70 is lowered by energizing cylinders 184 and 119, respectively, so that the stacks are now ready to be indexed to the next station. The aligned stacks are next indexed to the flux and preheat station 32 by energizing indexing cylinder 186.

When the stacks are indexed to the flux and preheat mechanism 215, cylinder 224 thereof will have been energized to pivot the heater boxes 218 outwardly from the frame which at the same time opens the covers 242 of flux tray 220. Flux is then applied to the lugs of the plates by lowering the stacks to the position shown in FIG. 42 by energizing cylinder 184. The transfer head and stacks are then raised to the position shown in FIG. 43 for preheating.

To preheat, the heater boxes 218 are pivoted to the preheat position shown in FIG. 43 by energizing cylinder 224. The retracting movement of the heater boxes will cause covers 242 to close over the flux tray 220. Air heated by elements 238 is then blown across the lugs by blowers 236 which force air out through nozzles 240 onto the lugs.

Upon completion of the preheating step blowers 236 are shut off and heater boxes are pivoted back out from the frame to permit indexing of the fluxed and preheated stacks to the casting station 34. When the stacks are indexed to the casting station the casting pots 308 are in the retracted position away from the mold assembly. After the stacks reach the casting station the casting pots will be pivoted to pouring position (FIG. 53) by cylinders 320, 322. The molds are then poured by energizing solenoids 420 to allow a metered amount of molten lead to flow into each mold. As the pouring of the molds is about completed, the transfer head is lowered by cylinder 184 to thus lower the lugs of stacks 26 into the molten lead in the molds to thereby weld the plates to the post straps.

The post straps are allowed to harden in the molds and then the entire mold assembly 342 is lowered by cylinder 350 so that knock-out pins 378 will force the post straps from the molds as shown in FIG. 54. The completed elements are then raised by transfer head cylinder 184, pots 308 are retracted and the elements are indexed to the unloading station 36.

The finished elements are transferred from transfer head 46 to the unload apparatus 432 by raising unload head 438 and lowering transfer head 46 to the position shown in FIG. 71. The clamping cylinder 466 of unload head 438 is then energized to clamp the elements in the unload head and the clamping cylinder 168 of the transfer head is energized to release the elements therefrom. Both the transfer and unload heads are then returnd to their former positions at which time the unload head is pivoted by tilting cylinder 470 to the position shown in FIG. 72 wherein the elements are deposited on conveyor belt 482 of take-off conveyor 434. The elements are then released from the unload head by energizing clamping cylinder 466 in the release direction.

The motor drive of the take-off conveyor is operated at controlled intervals so that as each batch of elements is deposited on the belt by unload head 438 they will be indexed towards the unloading end of the conveyor where they are removed therefrom.

Although but a single embodiment of the present invention has been illustrated and described, it will be apparent to those skilled in the art that various changes and modifications may be made therein without departing from the spirit of the invention or from the scope of the appended claims.

We claim:

1. A machine for fabricating storage battery elements comprising:

fluxing mechanism for applying flux to the plates of a battery stack, said fluxing mechanism including a flux tray and a pair of heaters pivotally mounted for movement towards and away from said tray, said heaters adapted to preheat the plates of a stack;

casting mechanism for casting a post strap and welding it to the plates of a battery stack, said casting mechanism including a mold assembly and a casting pot mounted adjacent said mold assembly;

transfer mechanism for transferring a stack to said fluxing mechanism for the application of flux to the plates and for then transferring the stack to said casting mechanism for the welding of a post strap to the stack, said transfer mechanism including a plurality of spaced transfer arms mounted for horizontal movement from one location to another, a transfer head movably mounted on each of said transfer arms for vertical movement with respect thereto, said transfer head adapted to grip a battery stack and carry it from one location to another, an actuating means for raising and lowering each of said transfer heads on said transfer arms so that each battery stack carried by each transfer head can be raised and lowered at said fluxing and casting mechanisms independently of each other; and indexing mechanism for moving said transfer arms to swing said transfer heads from one location to another.

2. A machine according to claim 1 in which said flux tray has a pair of movable covers operatively connected to said heaters and adapted to close and open over said tray as said heaters are pivoted towards and away from said tray.

3. A machine for fabricating storage battery elements comprising:

an alignment mechanism for accurately aligning the plates and separators of a battery stack, said alignment mechanism including a frame having an alignment box and a vibration means mounted thereon, said alignment box adapted to receive and hold a battery stack therein for vibration by said vibration means to align the stack in the box, said alignment box pivotally mounted on said frame so it can be tilted from a vertical position to facilitate loading of a stack therein and then pivoted back to a vertical position for removal of the stack after the stack has been aligned by said vibration means;

transfer mechanism for removing a stack from said alignment box when said box is in a vertical position, said transfer mechanism including a transfer arm mounted for horizontal movement from one location to another, a transfer head movably mounted on said transfer arm for vertical movement with respect thereto, said transfer head adapted to grip a battery stack in said alignment box and withdraw it vertically therefrom for subsequent movement to another location for further processing.

4. A machine according to claim 3 in which said vibration means includes a rotating cam and a return spring, said cam adapted to engage said alignment box and cause it to reciprocate against the bias of said return spring.

5. A machine according to claim 3 in which said alignment mechanism further includes a load head mounted on said frame, said load head having a movable stop bar against which a stack is held therein, said alignment box having a release finger adapted to depress said stop bar when said alignment box is tilted from its vertical position into alignment with said load head to thereby permit a stack to be loaded into said alignment box from said load head.

6. A machine for fabricating storage battery elements by casting a post strap and welding it to the plates of a battery stack comprising:

a frame;

a mold assembly mounted thereon, said mold assembly including a plurality of molds adapted to receive molten lead for casting post straps, said mold assembly adapted to receive stacks inserted into the molten lead in said molds to thereby weld the plates of the stacks to the post straps in the mold;

a casting pot mounted on said frame, said casting pot having a plurality of pouring outlets in the lower portion thereof below the normal surface level of the molten lead in said pot, a control valve for each of said pouring outlets through which molten lead will flow by gravity upon opening of said control valve, said casting pot movably mounted on said frame so it can be moved laterally out of the way to permit a stack to be inserted into the molten lead in a mold and to permit a completed element to be removed from said mold assembly.

7. A machine for fabricating storage battery elements comprising:
   an alignment mechanism for accurately aligning the plates and separators of a battery stack, said alignment mechanism including a frame having an alignment box and a vibration means mounted thereon, said alignment box adapted to receive and hold a battery stack therein for vibration by said vibration means to align the stack in the box, said alignment box pivotally mounted on said frame so it can be tilted from a vertical position to facilitate loading of a stack therein and then pivoted back to a vertical position for removal of the stack after the stack has been aligned by said vibration means;
   fluxing mechanism for applying flux to the plates of a battery stack, said fluxing mechanism including a flux tray adapted to hold a flux;
   casting mechanism for casting a post strap and welding it to the plates of a battery stack, said casting mechanism including a mold assembly and a casting pot mounted adjacent said mold assembly;
   transfer mechanism for transferring a stack from said alignment mechanism to said fluxing mechanism for the application of flux to the plates and then to said casting mechanism for the welding of a post strap to the stack, said transfer mechanism including a plurality of spaced transfer arms mounted for horizontal movement from one mechanism to the next, a transfer head movably mounted on each of said transfer arms for vertical movement with respect thereto, said transfer head adapted to grip a battery stack and carry it from one location to another, and an actuating means for raising and lowering each of said transfer heads on said transfer arms so that each battery stack carried by said transfer head can be raised and lowered at said alignment, fluxing and casting mechanisms independently of each other; and
   indexing mechanism for moving said transfer arms to swing said transfer heads from one location to another.

8. A machine for fabricating multi-component storage battery elements including plates and separators, said machine comprising, in combination,
   an alignment mechanism for accurately aligning the battery element components to form a battery stack, said alignment mechanism including an alignment box and a vibration means, said alignment box adapted to receive and hold a battery stack therein for vibration by said vibration means to align the stack in the box, said alignment box pivotally mounted so it can be tilted from a vertical position to facilitate loading a stack therein and then pivoted back to a vertical position for removal of the stack after the stack has been aligned by said vibration means; and
   transfer mechanism for removing a stack from said alignment box when said box is in a vertical position, said transfer mechanism including a transfer head mounted for vertical movement with respect to said alignment box, said transfer head adapted to grip a battery stack in said alignment box and withdraw it vertically therefrom for further processing.

9. A machine for fabricating storage battery elements comprising:
   fluxing mechanism for applying flux to the plates of a battery stack;
   casting mechanism for casting a post strap and welding it to the plates of a battery stack, said casting mechanism including a mold assembly and a pair of casting pots mounted adjacent said mold assembly, said casting pots being movably mounted so that they can be moved out of the way to permit a stack to be lowered to the mold assembly, said casting pots having a plurality of pouring outlets positioned in the lower portion thereof below the normal surface level of the molten lead in said pots, and a control valve for each of said pouring outlets through which molten lead will flow by gravity upon opening of said control valves;
   transfer mechanism for transferring a stack to said fluxing mechanism for the application of flux to the plates and for then transferring the stack to said casting mechanism for the welding of a post strap to the stack, said transfer mechanism including a plurality of spaced transfer arms mounted for horizontal movement from one location to another, a transfer head movably mounted on each of said transfer arms for vertical movement with respect thereto, said transfer head adapted to grip a battery stack and carry it from one location to another, an actuating means for raising and lowering each of said transfer heads on said transfer arms so that each battery stack carried by each transfer head can be raised and lowered at said fluxing and casting mechanisms independently of each other; and
   indexing mechanism for moving said transfer arms to swing said transfer heads from one location to another.

10. A machine for fabricating storage battery elements by casting a post strap and welding it to the plates of a battery stack comprising:
    a frame;
    a mold assembly mounted thereon, said mold assembly including a plurality of molds adapted to receive molten lead for casting post straps, said mold assembly adapted to receive stacks inserted into the molten lead in said molds to thereby weld the plates of the stacks to the post straps in the molds;
    a casting pot mounted on said frame, said casting pot having a plurality of pouring outlets in the lower portion thereof below the normal surface level of the molten lead in said pot, a control valve means for each of said pouring outlets through which molten lead will flow by gravity upon opening of said control valve means, each of said control valve means including a valve member adapted for movement inside said casting pot and below the surface of the molten lead in said casting pot, said casting pot movably mounted on said frame so it can be moved laterally out of the way to permit a stack to be inserted into the molten lead in a mold and to permit a completed element to be removed from said mold assembly.

11. A machine for fabricating multi-component storage battery elements including plates and separators, said machine having an alignment station, a fluxing station, and a casting station comprising, in combination, alignment mechanism at the alignment station for accurately aligning the battery element components to form a battery stack; fluxing mechanism at the fluxing station for applying flux to a portion of the plates of the battery stack, said fluxing mechanism including a flux bath into which said portion of the plates of a battery stack are inserted for application of flux thereto and a laterally movable hot air supply means for preheating the plates; casting mechanism at the casting station for casting a post strap and welding it to the fluxed portion of the plates of a battery stack; and transfer mechanism for transferring a stack between said stations including a plurality of transfer heads adapted to grip a battery stack and carry it from one station to another, said transfer mechanism further including an actuator means for raising and lowering each of said transfer heads independently of each other so that each battery stack carried by each transfer head can be raised and lowered at the respective stations independently of each other.

(References on following page)

References Cited by the Examiner

UNITED STATES PATENTS

| | | | |
|---|---|---|---|
| 2,084,608 | 6/1937 | Chernof | 118—4 |
| 2,396,578 | 3/1946 | Kittel et al. | 118—429 |
| 2,519,739 | 8/1950 | Butner | 22—85 |
| 2,520,252 | 8/1950 | Mütchler | 214—1 |
| 2,542,503 | 2/1951 | Galloway | 22—58 |
| 2,577,766 | 12/1951 | Johnson et al. | 214—1 |
| 2,624,106 | 1/1953 | Lund | 29—204 |
| 2,679,824 | 6/1954 | Schmuldt | 118—428 |
| 2,681,971 | 6/1954 | Strickland et al. | 266—4 |
| 2,735,148 | 2/1956 | Shannon et al. | 22—58 |
| 2,749,583 | 6/1956 | Loewenstein | 22—79 |
| 2,799,905 | 7/1957 | Vieth | 22—58 |
| 2,815,551 | 12/1957 | Hessenberg et al. | 22—57.2 |
| 2,843,895 | 7/1958 | Hallsworth | 22—77 |
| 2,893,057 | 7/1959 | Rekettye | 22—77 |
| 2,916,131 | 12/1959 | Holden | 118—425 |
| 3,052,968 | 9/1962 | Kerns | 29—204 |

J. SPENCER OVERHOLSER, *Primary Examiner.*

MARCUS U. LYONS, ROBERT F. WHITE, MICHAEL V. BRINDISI, *Examiners.*

R. W. McDONALD, H. E. MINCHEW, R. D. BALDWIN, F. I. SMITH, *Assistant Examiners.*